United States Patent
Zhodzishsky et al.

(10) Patent No.: US 9,798,017 B2
(45) Date of Patent: Oct. 24, 2017

(54) REDUCING TIME AND INCREASING RELIABILITY OF AMBIGUITY RESOLUTION IN GNSS

(71) Applicant: LLC "Topcon Positioning Systems", Moscow (RU)

(72) Inventors: Mark Isaakovich Zhodzishsky, Moscow (RU); Roman Anatolyevich Nevzorov, Moscow (RU); Sergey Vladislavovich Averin, Obninsk (RU); Andrey Valerievich Plenkin, Kashira (RU); Viktor Abramovich Veitsel, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 15/320,056

(22) PCT Filed: Apr. 9, 2015

(86) PCT No.: PCT/RU2015/000235
§ 371 (c)(1),
(2) Date: Dec. 19, 2016

(87) PCT Pub. No.: WO2016/163910
PCT Pub. Date: Oct. 13, 2016

(65) Prior Publication Data
US 2017/0254904 A1 Sep. 7, 2017

(51) Int. Cl.
*G01S 19/44* (2010.01)
*G01S 19/04* (2010.01)

(52) U.S. Cl.
CPC ............. *G01S 19/44* (2013.01); *G01S 19/04* (2013.01)

(58) Field of Classification Search
CPC ................................ G01S 19/44; G01S 19/04
(Continued)

(56) References Cited

U.S. PATENT DOCUMENTS 7,312,747 B2   12/2007   Vollath et al.
7,538,721 B2   5/2009    Vollath et al.
(Continued)

FOREIGN PATENT DOCUMENTS

RU   2009139282 A   4/2011
WO   2005010549 A2  2/2005
WO   2012130252 A1  10/2012

OTHER PUBLICATIONS

International Search Report and Written Opinion dated Feb. 4, 2016 in connection with international patent application No. PCT/RU2015/000235, 6 pages.
(Continued)

*Primary Examiner* — Harry Liu
(74) *Attorney, Agent, or Firm* — Chiesa Shahinian & Giantomasi PC

(57) ABSTRACT

A first plurality of differences (first differences or second differences) of carrier phase measurements of global navigation satellite system (GNSS) signals corresponding to a first measurement epoch is received. A plurality of differences of carrier phase ambiguities of the first plurality of differences of carrier phase measurements is resolved. A first fixed position of the rover is computed. A first plurality of sub-corrections is computed based at least in part on the first fixed position of the rover, a position of the base, a position of each specific GNSS satellite, and the first plurality of differences of carrier phase measurements. The first plurality of sub-corrections is then used to reduce the processing time for ambiguity resolution of carrier phase measurements in
(Continued)

subsequent measurement epochs. The sub-corrections can be smoothed, aged, or smoothed and aged.

30 Claims, 15 Drawing Sheets

(58) Field of Classification Search
USPC .................................................. 342/357.27
See application file for complete search history.

(56) References Cited

U.S. PATENT DOCUMENTS

| | | |
|---|---|---|
| 7,589,668 B2 | 9/2009 | Vollath et al. |
| 7,692,578 B2 | 4/2010 | Vollath et al. |
| 8,174,437 B2 | 5/2012 | Whitehead |
| 2010/0321236 A1 | 12/2010 | Diggelen et al. |
| 2011/0025555 A1* | 2/2011 | Whitehead ............ G01S 19/33 342/357.24 |
| 2011/0102254 A1* | 5/2011 | Fenton .................. G01S 19/44 342/357.27 |
| 2011/0115669 A1 | 5/2011 | Milyutin et al. |
| 2013/0044026 A1* | 2/2013 | Chen ..................... G01S 19/07 342/357.27 |
| 2015/0293233 A1* | 10/2015 | De Jong ................ G01S 19/04 342/357.27 |

OTHER PUBLICATIONS

L. Mervart et al., "Precise Point Positioning with Fast Ambiguity Resolution—Prerequisites, Algorithms and Performance", Proc. 26th Int. Tech Meeting ION Satellite Div.,ION GNSS+2013, Nashville, TN, Sep. 16-20, 2013, pp. 1176-1185.

M.E.Goode et al., "Time Correlation in GNSS Precise Point Positioning", Proc. 26th Int. Tech Meeting ION Satellite Div., ION GNSS+2013, Nashville, TN, Sep. 16-20, 2013, pp. 1207-1214.

\* cited by examiner

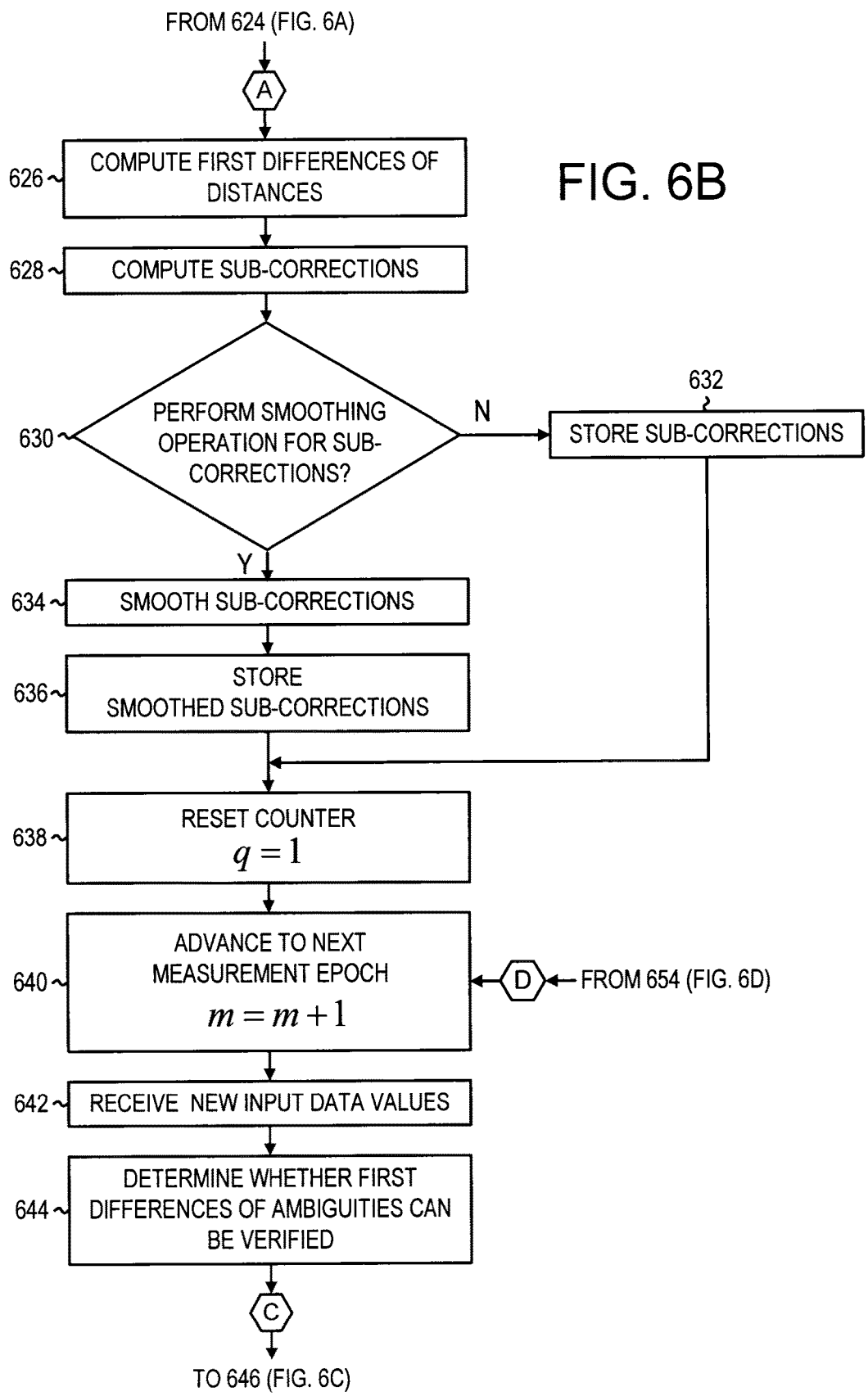

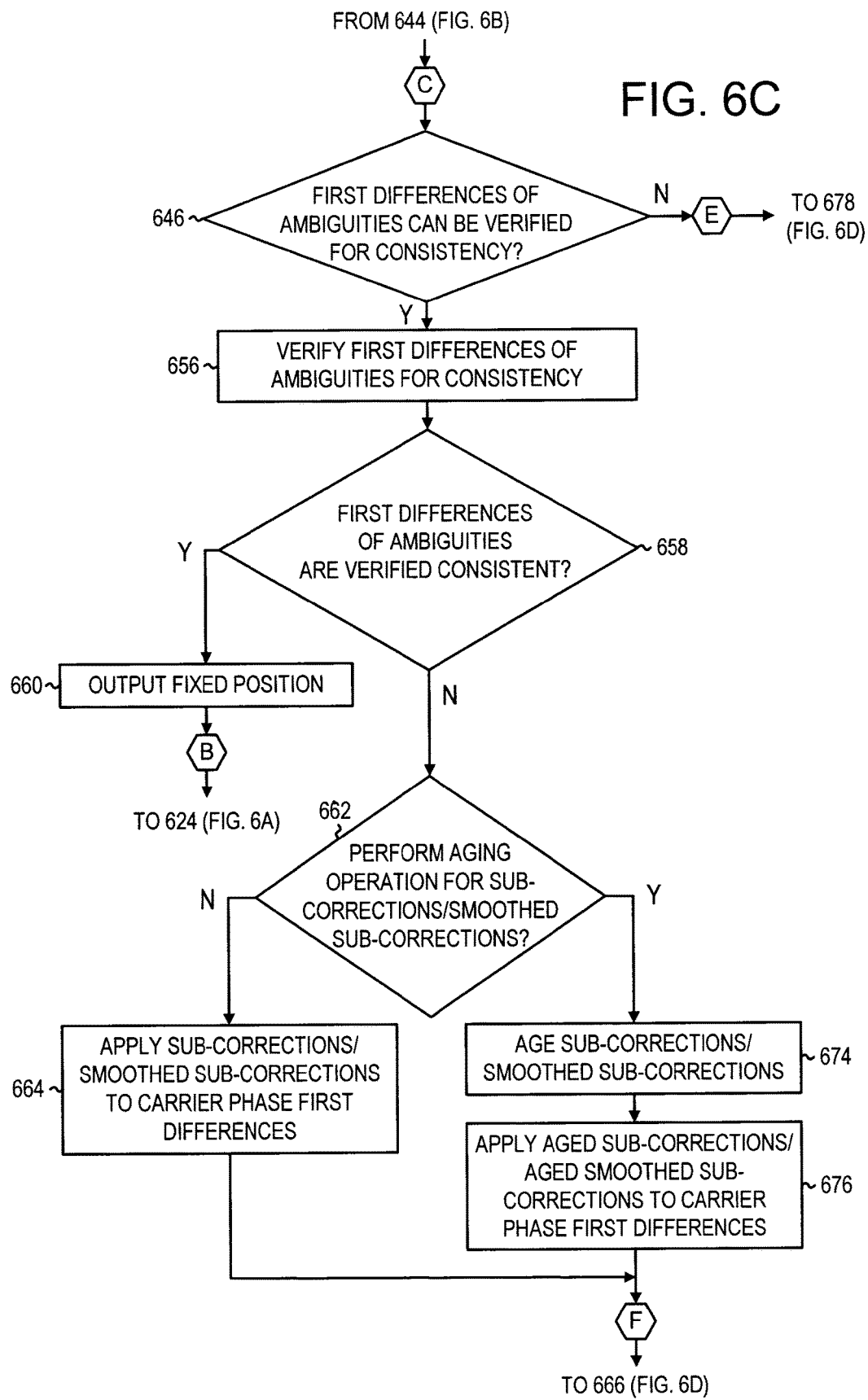

REDUCING TIME AND INCREASING RELIABILITY OF AMBIGUITY RESOLUTION IN GNSS

CROSS-REFERENCE TO RELATED APPLICATIONS

This application is a national stage (under 35 U.S.C. 371) of International Patent Application No. PCT/RU2015/000235, filed Apr. 9, 2015, which is herein incorporated by reference in its entirety.

BACKGROUND OF THE INVENTION

The present invention relates generally to global navigation satellite systems, and more particularly to method and apparatus for ambiguity resolution of global navigation satellite system signals.

Global navigation satellite systems (GNSSs) can determine target parameters, such as position, velocity, and time (PVT). Examples of currently deployed global navigation satellite systems include the United States Global Positioning System (GPS) and the Russian GLONASS. Other global navigation satellite systems, such as the European GALILEO and the Chinese Beidou systems, are under development. In a GNSS, a navigation receiver receives and processes radio signals transmitted by satellites located within a line-of-sight of the receiver. The satellite signals comprise carrier signals modulated by pseudo-random binary codes. The receiver measures the time delays of the received signals relative to a local reference clock or oscillator. Code phase measurements enable the receiver to determine the pseudo-ranges between the receiver and the satellites. The pseudo-ranges differ from the actual ranges (distances) between the receiver and the satellites due to an offset between the time scales of the GNSS and the receiver. If signals are received from a sufficiently large number of satellites, then the measured pseudo-ranges can be processed to determine the coordinates and the offset between the time scales of the GNSS and the receiver. This operational mode is referred to as a stand-alone mode, since the measurements are determined by a single receiver. A stand-alone system typically provides a position accuracy on the order of a meter.

To improve the position accuracy, differential navigation (DN) systems have been developed. In a DN system, the position of a user is determined relative to a base station, also referred to as a base. The base is typically fixed, and the coordinates of the base are precisely known; for example, by surveying. The base contains a navigation receiver that receives satellite signals and that can determine the corrections to GNSS measurements based on the known base position. In some DN systems, the raw measurements of the base can serve as corrections.

The user, whose position is to be determined, can be stationary or mobile; in a DN system, the user is often referred to as a rover. The rover also contains a navigation receiver that receives GNSS satellite signals. Corrections generated at the base are transmitted to the rover via a communications link. To accommodate a mobile rover, the communications link is often a wireless link. The rover processes the corrections received from the base, along with measurements taken with its own receiver, to improve the accuracy of determining its position. Accuracy is improved in the differential navigation mode because errors incurred by the receiver at the rover and by the receiver at the base are highly correlated. Since the coordinates of the base are accurately known, measurements from the base can be used for calculating corrections, thus compensating the errors at the rover. A DN system provides corrections to pseudo-ranges measured with code phase. A DN system can provide a position accuracy on the order of tenths of a meter.

The position accuracy of a differential navigation system can be further improved if the pseudo-ranges measured with code phase are supplemented with the pseudo-ranges measured with carrier phase. If the carrier phases of the signals transmitted by the same satellite are measured by both the navigation receiver in the base and the navigation receiver in the rover, processing the two sets of carrier phase measurements can yield a position accuracy to within several percent of the carrier's wavelength (on the order of centimeters or, in some instances, millimeters). A differential navigation system that computes positions based on real-time carrier phase pseudo-range measurements, in addition to the code phase pseudo-range measurements, is often referred to as a real-time kinematic (RTK) system.

Processing carrier phase measurements to determine coordinates includes the step of ambiguity resolution; that is, determining the integer number of cycles in the carrier signal received by the navigation receiver from an individual satellite. Method and apparatus for reducing the time for ambiguity resolution and for increasing the reliability of ambiguity resolution are advantageous.

BRIEF SUMMARY OF THE INVENTION

In an embodiment, global navigation satellite system (GNSS) signals are processed according to the following method. A first plurality of first differences of carrier phase measurements is received. The first plurality of first differences of carrier phase measurements is based at least in part on GNSS signals received by a rover from a first plurality of GNSS satellites at a first measurement epoch and GNSS signals received by a base from the first plurality of GNSS satellites at the first measurement epoch. A plurality of first differences of carrier phase ambiguities of the first plurality of first differences of carrier phase measurements is resolved.

A first fixed position of the rover is computed, in which the first fixed position of the rover is based at least in part on the plurality of first differences of carrier phase ambiguities of the first plurality of first differences of carrier phase measurements. A first plurality of sub-corrections is computed, in which the first plurality of sub-corrections is based at least in part on the first fixed position of the rover, a position of the base, a position of each specific GNSS satellite in the first plurality of GNSS satellites, the first plurality of first differences of carrier phase measurements, and the plurality of first differences of carrier phase ambiguities of the first plurality of first differences of carrier phase measurements.

In an embodiment, a second plurality of first differences of carrier phase measurements is received, in which the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch. A step is performed to verify whether the plurality of first differences of carrier phase ambiguities of the first plurality of first differences of carrier phase measurements is consistent for the second measurement epoch.

Upon verifying that the plurality of first differences of carrier phase ambiguities of the first plurality of first differences of carrier phase measurements is consistent for the second measurement epoch, a second fixed position of the rover is outputted, in which the second fixed position of the rover is based at least in part on the second plurality of first differences of carrier phase measurements and the plurality of first differences of carrier phase ambiguities of the first plurality of first differences of carrier phase measurements. A second plurality of sub-corrections is computed, in which the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements.

Upon verifying that the plurality of first differences of carrier phase ambiguities of the first plurality of first differences of carrier phase measurements is not consistent for the second measurement epoch, a plurality of first differences of corrected carrier phase measurements is computed by applying the first plurality of sub-corrections to the second plurality of first differences of carrier phase measurements. An attempt is made to resolve a plurality of first differences of carrier phase ambiguities of the plurality of first differences of corrected carrier phase measurements. Upon resolving a plurality of first differences of carrier phase ambiguities of the plurality of first differences of corrected carrier phase measurements, a second fixed position of the rover is computed and outputted, in which the second fixed position of the rover is based at least in part on the plurality of first differences of carrier phase ambiguities of the plurality of first differences of corrected carrier phase measurements. A second plurality of sub-corrections is computed, in which the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements.

In further embodiments, the sub-corrections are smoothed, aged, or smoothed and aged.

In further embodiments, a method similar to the one described above is performed with second differences of carrier phase measurements instead of first differences of carrier phase measurements.

These and other advantages of the invention will be apparent to those of ordinary skill in the art by reference to the following detailed description and the accompanying drawings.

BRIEF DESCRIPTION OF THE DRAWINGS

FIG. 6A-FIG. 6D show a flowchart of a method for first-difference sub-corrections.

DETAILED DESCRIPTION

Global navigation satellite systems (GNSSs) can operate in various operational modes. Different operational modes require equipment of different complexities and can determine target parameters (such as position, velocity, and time) with different accuracies. The types and quantities of data to be processed also depend on the operational mode. Several operational modes are summarized below.

Figure 1A:
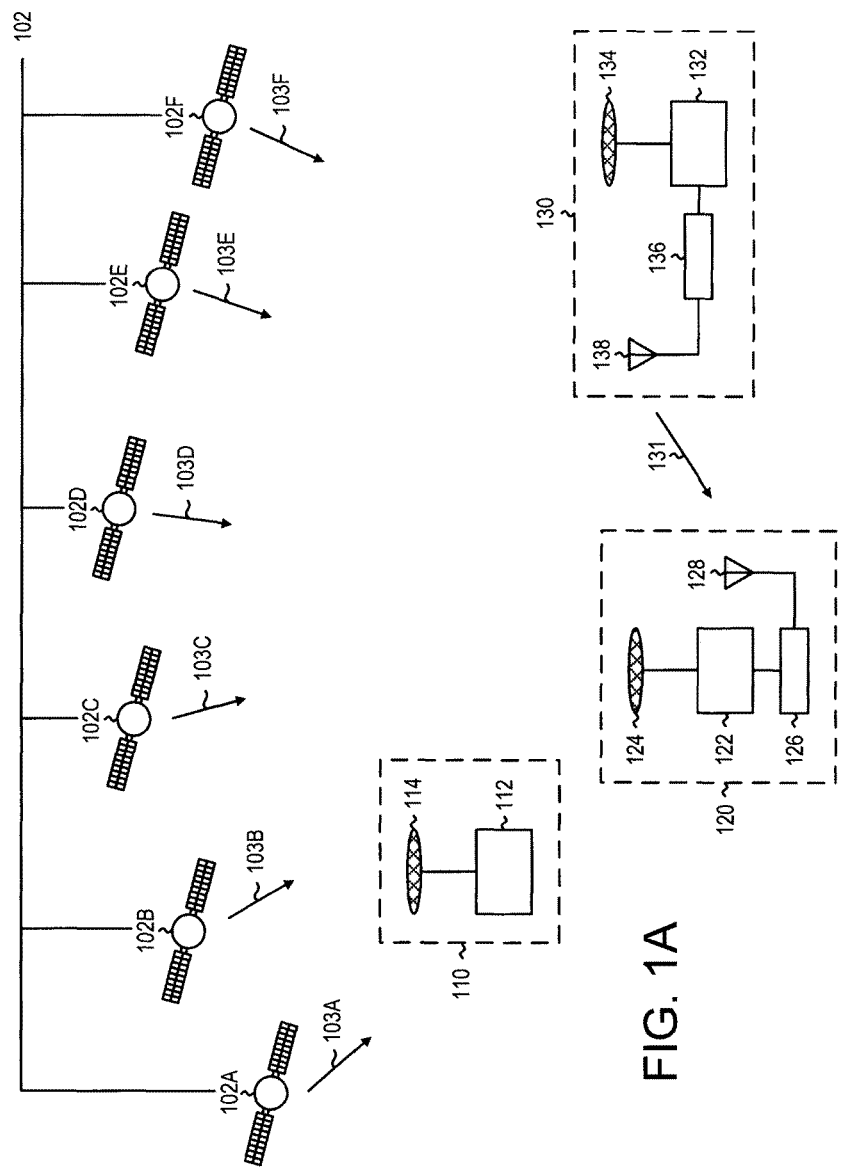
FIG. 1A shows an example of a global navigation satellite system in which the navigation receiver operates in a stand-alone mode or in a single-base-station differential navigation mode.

FIG. 1A shows a high-level schematic of a global navigation satellite system (GNSS). A constellation of global navigation satellites 102 transmits navigation signals. Shown are six representative navigation satellites, denoted navigation satellite 102A-navigation satellite 102F, which transmit navigation signal 103A-navigation signal 103F, respectively. In general, the navigation satellites can belong to more than one global navigation satellite system (for example, GPS and GLONASS).

Refer to the GNSS measurement unit 110, which operates in a stand-alone mode. The GNSS measurement unit 110 includes the antenna 114 and the navigation receiver 112. The antenna 114 receives navigation signals, such as navigation signal 103A-navigation signal 103F; from these navigation signals, the navigation receiver 112 can calculate target parameters, such as precision time referenced to a GNSS system clock and position and velocity referenced to the antenna 114. In some GNSS measurement units, the antenna is mounted in a fixed relationship with respect to the navigation receiver. If the GNSS measurement unit 110 is carried by a person who is walking or running, the GNSS measurement unit 110 can be used to calculate the position and velocity of the person as a function of time. If the GNSS measurement unit 110 is mounted on a moving vehicle, the GNSS measurement unit 110 can be used to calculate the position and velocity of the vehicle as a function of time.

In other GNSS measurement units, the antenna can be moved with respect to the navigation receiver. In one application, the antenna 114 is mounted on the blade of a bulldozer, and the navigation receiver 112 is mounted inside the cab of the bulldozer; the antenna 114 is coupled to the navigation receiver 112 via a flexible cable. The GNSS measurement unit 110 can then be used to measure the position and velocity of the blade as a function of time. To simplify the discussion below, phrases such as "position of the navigation receiver" or "position and velocity of the navigation receiver" are used; strictly, however, "position" and "velocity" refer to the parameters of the antenna that receives the navigation signals that are then processed by the navigation receiver.

The navigation signals comprise carrier signals modulated by pseudo-random binary codes. The navigation receiver measures the time delays of the received signals relative to a local reference clock or oscillator. Code phase measurements enable the navigation receiver to determine the pseudo-ranges, which in essence are estimates of the distances between the navigation receiver and the navigation satellites. The pseudo-ranges differ from the actual ranges (distances) between the navigation receiver and the navigation satellites due to the offset between the time scales of the navigation receiver and the respective GNSS.

If navigation signals are received from a sufficiently large number of navigation satellites, then the measured pseudo-ranges can be processed to determine the position of the navigation receiver. In general, the three-dimensional coordinates of the navigation receiver can be determined; a reference Cartesian coordinate (x,y,z) system can be used. The reference Cartesian coordinate system can be an Earth Centered Earth Fixed (ECEF) system; WGS-84 is an example of an ECEF system. Two-dimensional coordinates along a reference horizontal plane (x-y plane) or a one-dimensional coordinate (Z or height) along an axis normal to the reference horizontal plane can also be determined. The reference horizontal plane can, for example, be tangent to the WGS-84 ellipsoid. A time referenced to a GNSS system clock can also be calculated by the navigation receiver from the navigation signals (which contain timing information). Velocity of the navigation receiver can be calculated by taking the time derivative of position as a function of time, by processing Doppler measurements, or by processing carrier phase measurements over a specific interval of time.

Various error sources contribute to errors in determination of the position and time. Examples of error sources include satellite clock errors, satellite ephemeris errors, and variations in propagation velocities of the navigation signals due to the ionosphere and troposphere. Time scales of the navigation satellites are referenced to precision atomic on-board clocks and are synchronized with the GNSS time scale; however, there are residual satellite-specific drifts and offsets with respect to that GNSS time scale. Calculations of position, velocity, and time using pseudo-ranges require ephemeris data (orbital positions of the satellites); ephemeris data is encoded on the navigation signals, and is updated in real time periodically. Measured pseudo-ranges are affected by the propagation velocity of the navigation signals between the navigation satellites and the navigation receiver. The propagation velocity depends on the medium and varies as the navigation signal travels through the ionosphere and through the troposphere; instabilities in the ionosphere and troposphere can result in dynamic changes to the propagation velocity.

Some errors can be reduced by operating the GNSS in a differential navigation (DN) mode. Refer again to FIG. 1A. The GNSS measurement unit 130, also referred to as the base station (or base) 130, is fixed or stationary; its coordinates are precisely known (for example, from high-precision surveying measurements). The GNSS measurement unit 120, also referred to as the rover 120, in general is mobile.

The base station 130 includes the antenna 134 and the navigation receiver 132. The antenna 134 receives navigation signals, such as navigation signal 103A-navigation signal 103F. The base station 130 also includes the communications transceiver 136 and the antenna 138. Similarly, the rover 120 includes the antenna 124 and the navigation receiver 122. The antenna 124 receives navigation signals, such as navigation signal 103A-navigation signal 103F. The rover 120 also includes the communications transceiver 126 and the antenna 128. The base station 130 transmits the communications signal 131 (for example, a radiofrequency signal) from the antenna 138. The rover 120 receives the communications signal 131 at the antenna 128.

From the received navigation signals, the navigation receiver 132 at the base station 130 can calculate corrections to the received GNSS measurements with respect to the known position of the base station 130. In some DN systems, raw measurements of the base station can serve as corrections. If the distance between the base station 130 and the rover 120 is relatively small, then many of the errors at the base station 130 and at the rover 120 are correlated. The base station 130 transmits error correction data to the rover 120 via the communications signal 131. The error correction data includes data that can be used to correct errors from the various error sources discussed above, for example. The rover 120 processes the navigation signals and the error correction data to determine the position of the rover 120. The accuracy with which the rover 120 can determine its position in the differential navigation mode is higher than the accuracy with which the GNSS measurement unit 110 can determine its position in the stand-alone mode.

A DN system that broadcasts correction data to pseudo-ranges is often referred to as a differential global positioning system (DGPS), or a differential global navigation satellite system (DGNSS). The position determination accuracy of a DN system can be further improved if the pseudo-ranges measured with code phase are supplemented with the pseudo-ranges measured with carrier phase.

If the carrier phases of the signals transmitted by the same satellites are measured by both the navigation receiver in the base station and the navigation receiver in the rover, processing the two sets of carrier phase measurements can yield a position accuracy to within several percent of the carrier's wavelength. A DN system that determines positions based on real-time carrier phase pseudo-range measurements, in addition to the code phase pseudo-range measurements, is often referred to as a real-time kinematic (RTK) system. Processing carrier phase measurements to determine position includes the step of ambiguity resolution; that is, determining the integer number of cycles in the carrier signal received by the navigation receiver from an individual satellite.

More complex DN systems, including RTK systems, are configured as network DN systems. In a network DN system, error correction data for a rover is generated from measurements collected from a group of base stations that are geographically dispersed over a wide area. A network control center processes the measurements from the group of base stations and transmits the error correction data to the rover via various communications links, such as radiofrequency satellite signals or General Packet Radio Service (GPRS). Network DN systems can differ by application areas and target positioning accuracy.

Figure 1B:
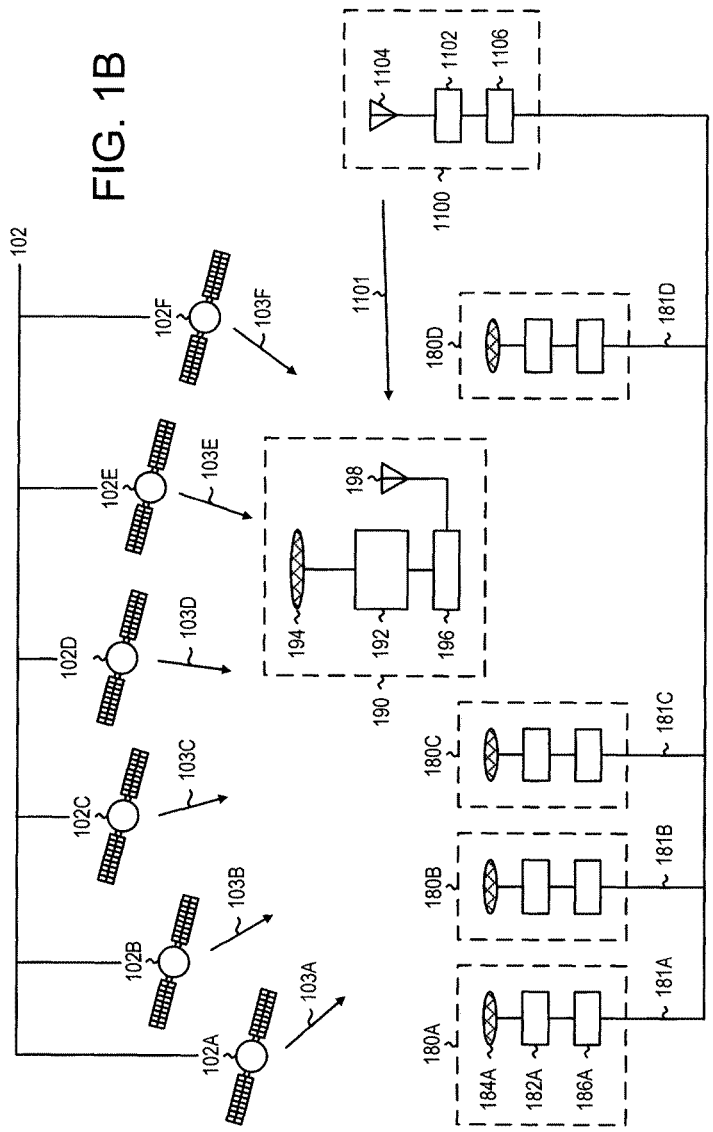
FIG. 1B shows an example of a global navigation satellite system in which the navigation receiver operates in a network differential navigation mode.

FIG. 1B shows an example of a regional (local) network DN system used to provide a network RTK solution; such systems are often referred to as Network RTK systems. Shown are the rover 190 and four representative base stations, denoted base station 180A-base station 180D. The rover 190 includes the antenna 194 and the navigation receiver 192. The antenna 194 receives navigation signals, such as navigation signal 103A-navigation signal 103F. The rover 190 also includes the communications transceiver 196 and the antenna 198. The base station 180A includes the navigation receiver 182A, the antenna 184A, and the data processing and communications unit 186A; base station 180B-base station 180D are each similar to the base station 180A.

In general, the rover and each base station can receive navigation signals from a slightly different subset of navigation satellites in the constellation 102, dependent on the specific navigation satellites in view at the rover and at each base station. Operation of the rover in a RTK mode is possible, however, only using satellite signals received simultaneously by the rover 190 and by the base stations 180A-180D.

Base station 180A-base station 180D transmit data 181A-data 181D, respectively, to the network control center (NCC) 1100. The data can be transmitted via communications links or via a communications network. The NCC 1100 includes the communications transceiver 1102, the antenna 1104, and the data processing and communications unit 1106. The NCC 1100 receives the data from the base stations as well as the approximate position of the rover and processes these data according to specific algorithms to generate a consolidated set of error correction data corresponding to the rover position (described in more detail below).

The NCC 1100 makes the consolidated set of error correction data available to the rover via various communication channels, such as GPRS. In FIG. 1B, the NCC 1100 delivers the consolidated set of error correction data via the communications signal 1101 (for example, a radiofrequency signal) transmitted from the antenna 1104. The rover 190 receives the communications signal 1101 at the antenna 198. The rover 190 then calculates its position based on measurements collected with its receiver and the consolidated set of error correction data.

The consolidated set of error correction data in network RTK systems can be partitioned into a few groups. The consolidated set of error correction data can include:
  Cumulative corrections to both code phase and carrier phase measurements from one or more individual base stations in a group of base stations;
  Corrections to code phase and carrier phase measurements for a virtual base station generated from processing GNSS measurements for a group of base stations;
  Corrections representing the dispersive part of GNSS measurement errors (measurement errors attributable to the ionosphere) for measurements from one or more individual base stations in a group of base stations;
  Corrections representing the non-dispersive part of GNSS measurement errors (measurement errors attributable to the troposphere, satellite ephemeris, and satellite clock data) for measurements from one or more individual base stations in a group of base stations;
  Coefficients approximating how various GNSS measurement error components change in space; and
  Other servicing information.

Figure 1C:
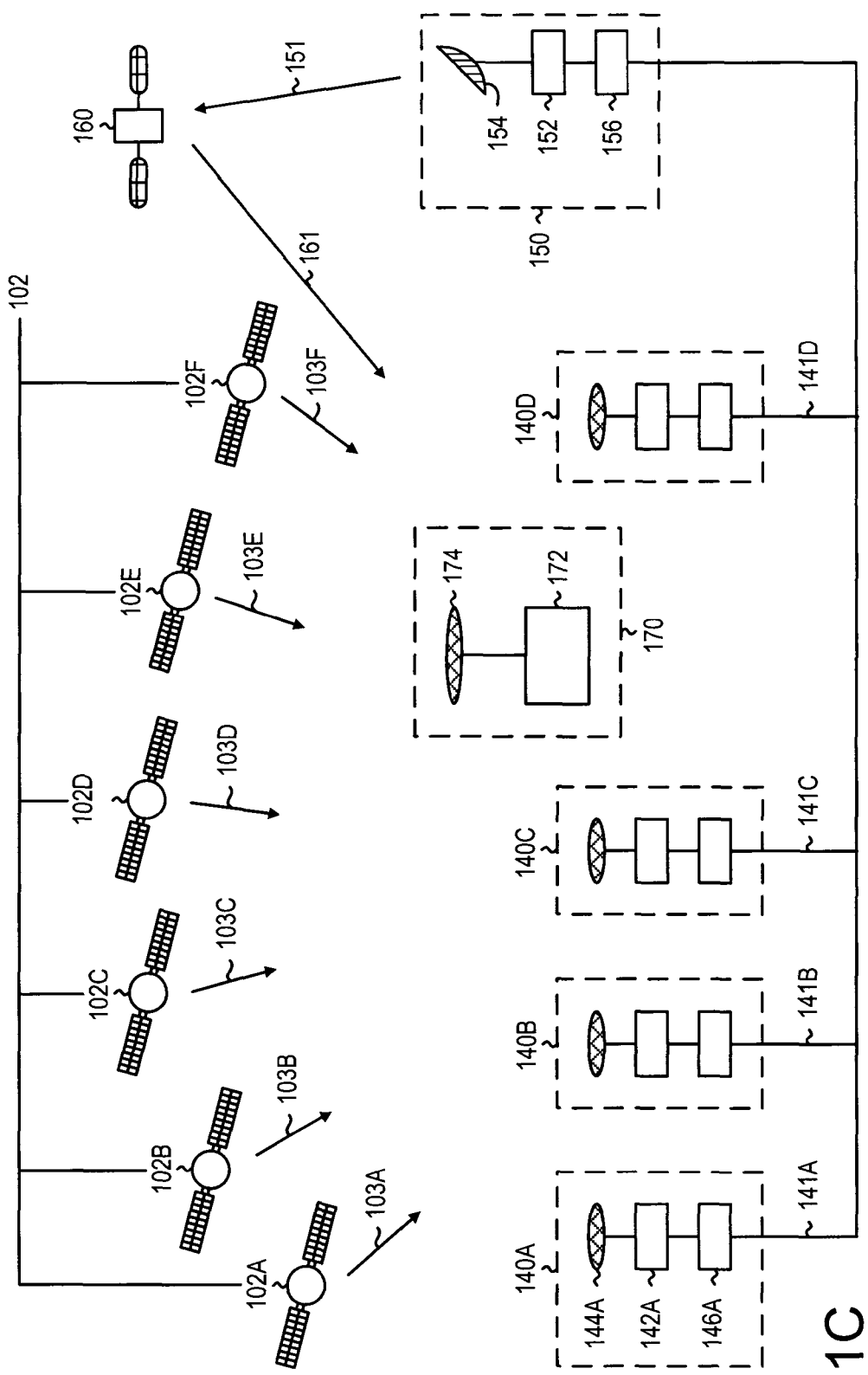
FIG. 1C shows an example of a global navigation satellite system in which the navigation receiver operates in a satellite-based network differential navigation mode.

FIG. 1C shows another example of a network DN system, referred to as a Space Based Augmentation System (SBAS). Shown are the rover 170 and four representative base stations, denoted base station 140A-base station 140D. The rover 170 includes the antenna 174 and the navigation receiver 172. The base station 140A includes the navigation receiver 142A, the antenna 144A, and the data processing and communications unit 146A; base station 140B-base station 140D are each similar to the base station 140A. In general, the rover and each base station can receive navigation signals from a slightly different subset of navigation satellites in the constellation 102, dependent on the specific navigation satellites in view at the rover and at each base station. Operation of the rover in a differential mode is possible, however, only using satellite signals received simultaneously by the rover 170 and by the base stations 140A-140D.

Base station 140A-base station 140D transmit data 141A-data 141D, respectively, to the network control center (NCC) 150. The data can be transmitted via communications links or via a communications network. The NCC 150 includes the satellite transmitter 152, the antenna 154, and the data processing and communications unit 156. The NCC 150 receives the data from the base stations and processes the data according to specific algorithms to generate a consolidated set of error correction data (described in more detail below). The NCC 150 transmits the consolidated set of error correction data to the geosynchronous (geostationary) relay satellite 160 via the satellite uplink channel 151.

The geosynchronous relay satellite 160 then retransmits the consolidated set of error correction data over a specific region (zone) of the Earth. Multiple geosynchronous relay satellites provide coverage for multiple zones. In FIG. 1C, the rover 170 receives the consolidated set of error correction data from the geosynchronous relay satellite 160 via the satellite signal 161. The rover 170 then calculates its position from the navigation signals and the consolidated set of error correction data. Note that the navigation receiver 172 in the rover 170 needs to be specially equipped to process the satellite signal 161.

The consolidated set of error correction data can be partitioned into a few groups. The consolidated set of error correction data can include:
  Corrections to code phase measurements from one or more individual base stations in a group of base stations;
  Corrections to both code phase and carrier phase measurements from one or more individual base stations in a group of base stations;
  Corrections to orbital (trajectory) parameters and clock parameters of GNSS satellites, specified in the processing of measurements from a group of base stations;
  Corrections to code phase measurements for a virtual base station generated from processing GNSS measurements for a group of base stations;
  Corrections to code phase and carrier phase measurements for a virtual base station generated from processing GNSS measurements for a group of base stations; and
  Other error correction data.

A third example of a network DN system, referred to as Precise Point Positioning (PPP), is similar to network RTK in some aspects, but correction data is presented differently. The architecture of the PPP system is identical to that of the SBAS. Referring to FIG. 1C, a PPP system includes a network of base stations 140A-140D distributed regionally or globally. They send their data to the network control center (NCC) 150. The NCC 150 receives the data from the base stations and processes the data according to specific algorithms to generate a consolidated set of error correction data (described in more detail below). As one option, the NCC 150 can transmit the consolidated set of error correction data to the geosynchronous (geostationary) relay satellite 160 via the satellite uplink channel 151. In another option, the NCC 150 can make the consolidated set of error correction data available to a rover via the Internet.

The key distinction between the PPP system and the typical SBAS, despite similarity in infrastructure, is better accuracy. The SBAS can provide position accuracy on the order of a meter or better; whereas, the PPP system is capable of delivering decimeter level position accuracy. In certain cases, PPP correction data sets can make possible carrier phase ambiguity resolution, thus leading to centimeter level position accuracy (similar to RTK).

The consolidated set of error correction data in a PPP system can be partitioned into a few groups. The consolidated set of error correction data can include:

Corrections to orbital (trajectory) parameters of GNSS satellites specified in the processing of measurements from a group of base stations;

Corrections to clock parameters of GNSS satellites, specified in the processing of measurements from a group of base stations;

Corrections for residual uncompensated errors of GNSS measurements; and

Other error correction data.

Each navigation satellite in a global navigation satellite system can transmit navigation signals on one or more frequency bands (for example, on the L1, L2, and L5 frequency bands). To simplify the terminology herein, a navigation receiver is also referred to simply as a receiver. A single-band receiver receives and processes signals on one frequency band (such as L1); a multi-band receiver receives and processes signals on two or more frequency bands (such as L1, L2, and L5). A single-system receiver receives and processes signals from a single GNSS (such as GPS); a multi-system receiver receives and process signals from two or more GNSSs (such as GPS, GLONASS, and GALILEO).

Figure 2:
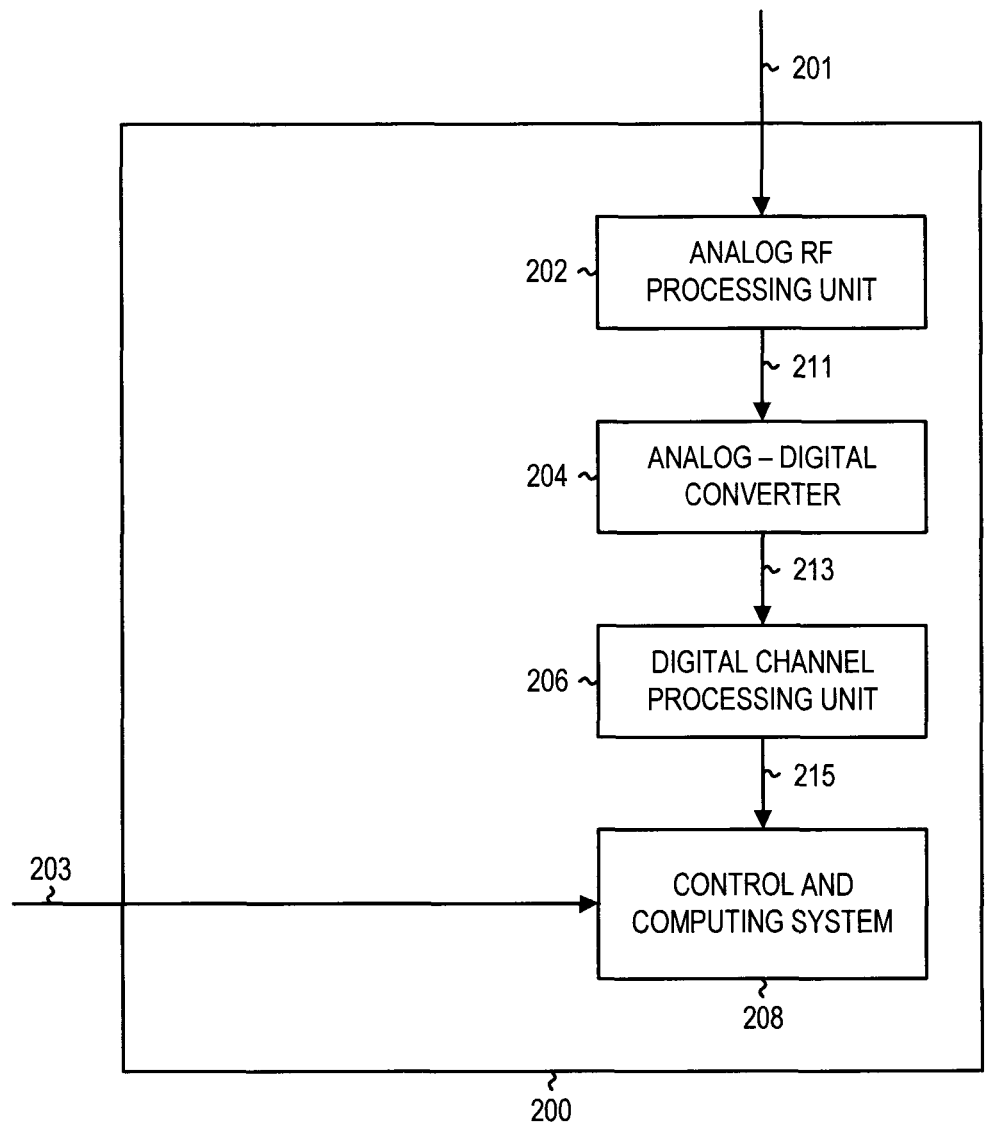
FIG. 2 shows a high-level schematic functional block diagram of a first embodiment of a navigation receiver.

FIG. 2 shows a high-level schematic functional block diagram of a first embodiment of a receiver, denoted as the receiver 200. The input analog signal 201 represents the total signal (also referred to as the combined signal, aggregate signal, or composite signal) of all the navigation signals received by the antenna (not shown) coupled to the receiver 200. For the example shown in FIG. 1A, the input analog signal 201 includes the navigation signal 103A-navigation signal 103F. The input analog signal 201 is first inputted into the analog radiofrequency (RF) processing unit 202. In the analog RF processing unit 202, the input analog signal 201 is amplified by a low-noise amplifier, filtered by a RF bandpass filter, and mixed with a local oscillator signal to generate an intermediate signal with an upconverted frequency and an intermediate signal with a downconverted frequency. An intermediate frequency bandpass filter removes the intermediate signal with the upconverted frequency and outputs the intermediate signal with the downconverted frequency; this output signal is denoted as the output analog signal 211.

The output analog signal 211 is inputted into the analog-digital converter (ADC) 204, which digitizes the analog signal 211. The output digital signal 213 is then inputted into the digital channel processing unit 206, which processes navigation data used for solving navigation tasks. The navigation data includes GNSS information (such as satellite ephemeris and satellite clock parameters) encoded on the navigation signals. The navigation data also includes code phase measurements (that is, delay times used to determine pseudo-ranges) calculated from delay-locked loops (DLLs). If the navigation receiver processes carrier phases, the navigation data also includes carrier phase measurements calculated from phase-locked loops (PLLs).

The output digital signal 215 is inputted into the control and computing system 208, which computes target parameters such as position, velocity, and time offset. If the receiver operates in a differential navigation mode, the control and computing system 208 receives the error correction data 203, used to compute target parameters with better accuracy. In the single-base-station DN system shown in FIG. 1A, the error correction data 203 would be received from the communications transceiver 126 in the rover 120. In the network DN system shown in FIG. 1B, the error correction data would be received from the communications transceiver 196 in the rover 190. In the network DN system shown in FIG. 1C, the error correction data 203 would be received from the satellite signal 161.

Figure 3:
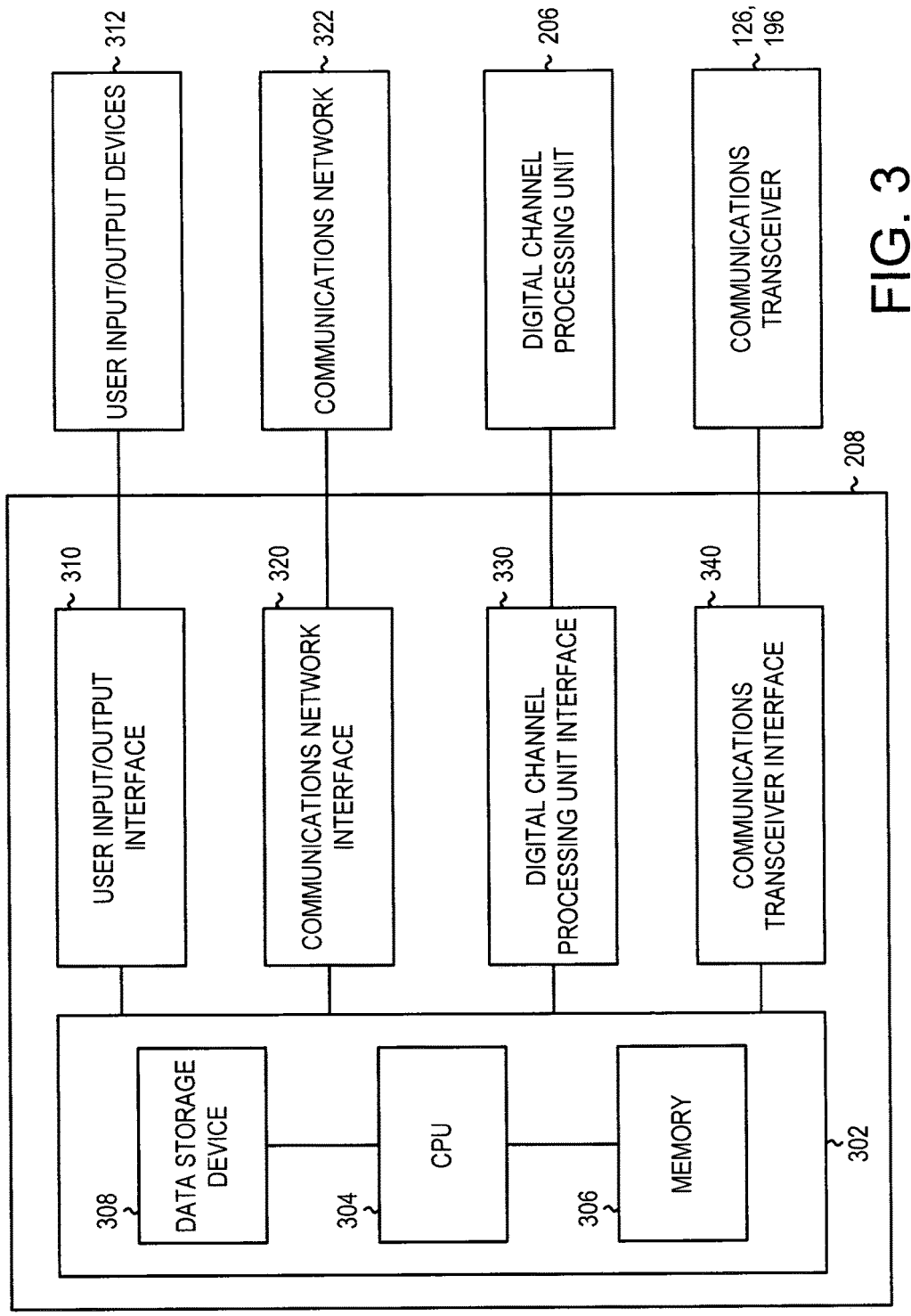
FIG. 3 shows a high-level schematic functional block diagram of a control and computing system implemented with a computer.

An embodiment of the control and computing system 208 is shown in FIG. 3. One skilled in the art can construct the control and computing system 208 from various combinations of hardware, firmware, and software. One skilled in the art can construct the control and computing system 208 from various electronic components, including one or more general purpose processors (such as microprocessors), one or more digital signal processors, one or more application-specific integrated circuits (ASICs), and one or more field-programmable gate arrays (FPGAs).

The control and computing system 208 includes a computer 302, which includes a processor [referred to as the central processing unit (CPU)] 304, memory 306, and a data storage device 308. The data storage device 308 includes at least one persistent, non-transitory, tangible computer readable medium, such as non-volatile semiconductor memory, a magnetic hard drive, or a compact disc read only memory.

The control and computing system 208 further includes a user input/output interface 310, which interfaces the computer 302 to user input/output devices 312. Examples of user input/output devices 312 include a keyboard, a mouse, a local access terminal, and a video display. Data, including computer executable code, can be transferred to and from the computer 302 via the user input/output interface 310.

The control and computing system 208 further includes a communications network interface 320, which interfaces the computer 302 with a communications network 322. Examples of the communications network 322 include a local area network and a wide area network. A user can access the computer 302 via a remote access terminal (not shown) communicating with the communications network 322. Data, including computer executable code, can be transferred to and from the computer 302 via the communications network interface 320.

The control and computing system 208 further includes a digital channel processing unit interface 330, which interfaces the computer 302 with the digital channel processing unit 206 (see FIG. 2).

The control and computing system 208 further includes a communications transceiver interface 340, which interfaces the computer 302 with a communications transceiver, such as the communications transceiver 126 (see FIG. 1A) or the communications transceiver 196 (see FIG. 1B).

As is well known, a computer operates under control of computer software, which defines the overall operation of the computer and applications. The CPU 304 controls the overall operation of the computer and applications by executing computer program instructions that define the overall operation and applications. The computer program instructions can be stored in the data storage device 308 and loaded into the memory 306 when execution of the program instructions is desired. The algorithms described below can be defined by computer program instructions stored in the memory 306 or in the data storage device 308 (or in a combination of the memory 306 and the data storage device 308) and controlled by the CPU 304 executing the computer program instructions. For example, the computer program instructions can be implemented as computer executable code programmed by one skilled in the art to perform algorithms. Accordingly, by executing the computer program instructions, the CPU 304 executes the algorithms described below.

Figure 4:
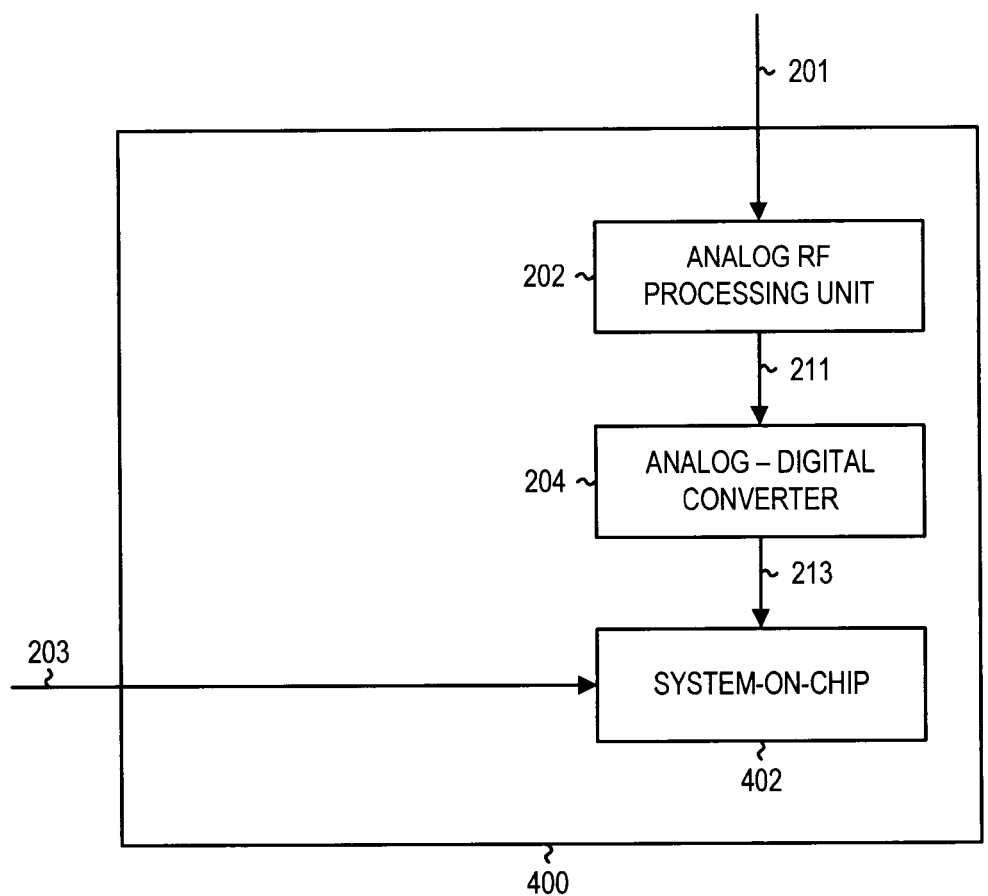
FIG. 4 shows a high-level schematic functional block diagram of a second embodiment of a navigation receiver.

FIG. 4 shows a high-level schematic functional block diagram of a second embodiment of a receiver, denoted as the receiver 400. The analog RF processing unit 202 and the analog-digital converter (ADC) 204 are the same as the ones described above in reference to FIG. 2. The output digital signal 213 is then inputted into the system-on-chip (SOC) 402, which is fabricated as a single ASIC; however, multiple ASICs can be used. The SOC 402 processes navigation data and digitized measurements to compute target parameters such as position, velocity, and time offset. If the receiver operates in a differential navigation mode, the SOC 402 also receives the error correction data 203, described above in reference to FIG. 2.

Figure 5:
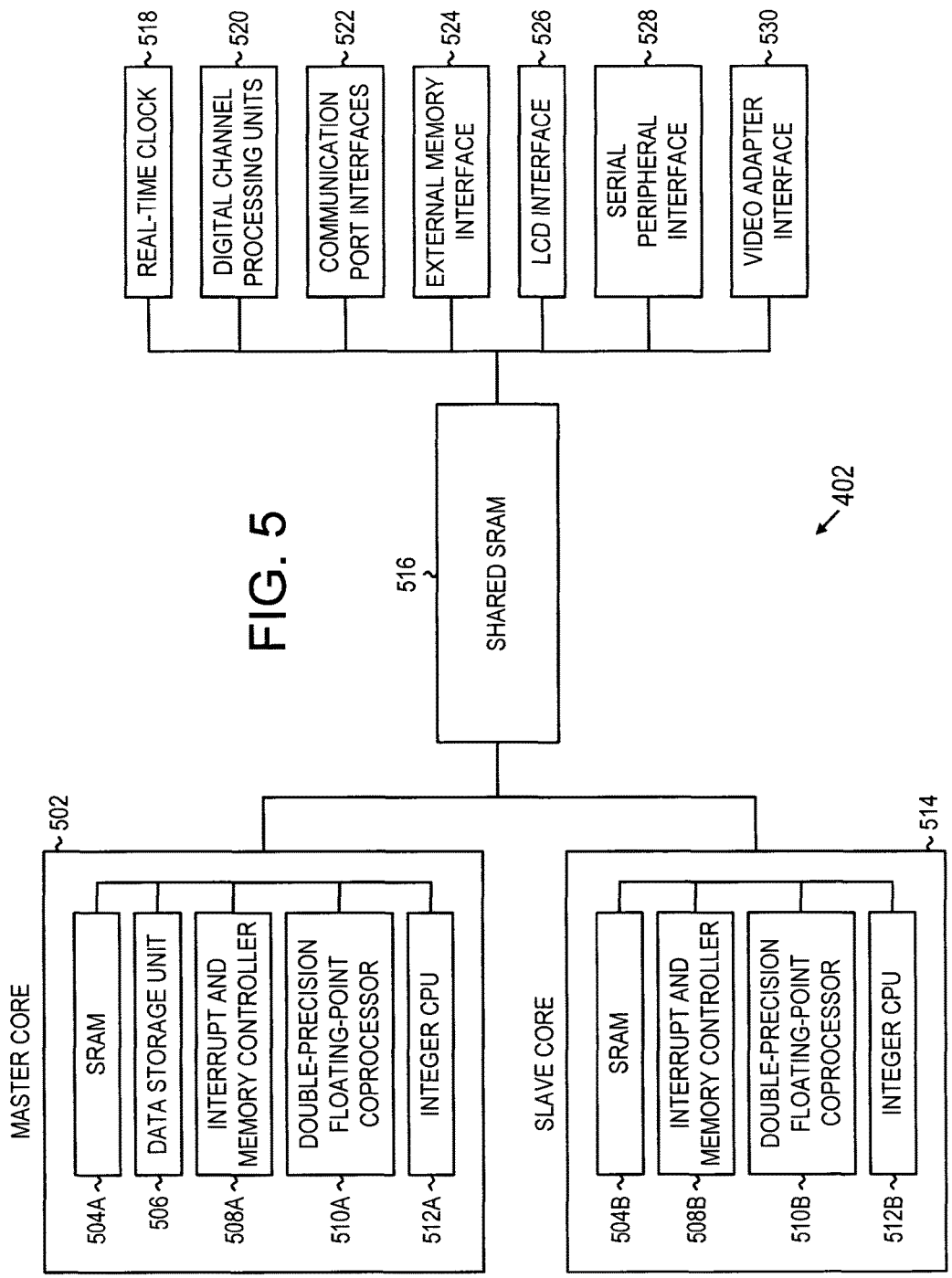
FIG. 5 shows a high-level schematic functional block diagram of a system-on-chip.

An embodiment of the SOC 402 is shown in FIG. 5. The SOC 402 includes two cores in a master-slave configuration: the master core 502 and the slave core 514. Using two cores helps to achieve faster operation for the whole system. One skilled in the art can construct a system with more than two cores and with different functions for each core.

The master core 502 includes the static random access memory SRAM 504A, and the slave core 514 includes the static random access memory SRAM 504B. The SRAM 504A and the SRAM 504B are used for storing temporal information and for information exchange within the master core 502 and the slave core 514, respectively.

The master core 502 further includes the interrupt and memory controller 508A, and the slave core 514 further includes the interrupt and memory controller 508B. The interrupt and memory controller 508A and the interrupt and memory controller 508B are used for synchronizing the operation of all components of the master core 502 and the slave core 514, respectively.

The master core 502 further includes the double-precision floating-point coprocessor 510A, and the slave core 514 further includes the double-precision floating-point coprocessor 510B. The double-precision floating-point coprocessor 510A and the double-precision floating-point coprocessor 510B are used to provide higher precision for calculations performed within the master core 502 and the slave core 514, respectively.

The master core 502 further includes the integer CPU 512A, and the slave core 514 further includes the integer CPU 512B. The integer CPU 512A and the integer CPU 512B controls the overall operation of the master core 502 and the slave core 514, respectively. The integer CPU 512A and the integer CPU 512B execute instructions that define the overall operation and applications.

The integer CPU 512A and the integer CPU 512B are run under the control of specific software, which defines the overall operation and applications. The software instructions are stored in an instruction cache in the data storage unit 506 in the master core 502, and the software instructions are loaded into the SRAM 504A and the SRAM 504B when execution of the software instructions is desired. The data storage unit 506 includes at least one persistent, non-transitory, tangible computer readable medium, such as non-volatile semiconductor memory.

The SOC 402 further includes the shared SRAM 516, which is used to exchange data, information, and instructions with other modules within the ASIC. The shared SRAM 516 is operably coupled to the master core 502, the slave core 514, and other modules. Examples of the other modules are provided below.

The SOC 402 further includes the real-time clock 518, which is used to create a time reference for the SOC 402 and the entire receiver 400.

The SOC 402 further includes one or more digital channel processing units 520, whose task is to process digitized measurement information and output raw code phase and carrier phase data. The total number of digital channel processing units 520 is a design choice; in some embodiments, the total number is large (for example, greater than or equal to 100).

The SOC 402 further includes one or more communication port interfaces 522, which interface the SOC 402 with external devices. Typical examples of the communication port interfaces 522 include universal asynchronous receiver/transmitter (UART), universal serial bus (USB), and Ethernet. The communication port interfaces 522 can be used to receive the correction data 203 and to control receiver operation.

The SOC 402 further includes the external memory interface 524, which interfaces the SOC 402 with external non-volatile memory.

The SOC 402 further includes the liquid crystal display (LCD) interface 526 for interfacing the SOC 402 with a LCD.

The SOC 402 further includes the serial peripheral interface (SPI) 528. The master core 502 can communicate with, and control, various slave devices via the SPI 528.

The SOC 402 further includes the video adapter interface 530, which can be used to couple the SOC 402 to a video monitor (separate from the LCD) via a video adapter. This interface is used, for example, during testing or troubleshooting of the SOC 402.

In GNSS-related applications, time is measured with respect to a common GNSS system time. Each GNSS has a central synchronizer performing GNSS timekeeping functions. This central synchronizer is typically implemented with a highly stable atomic oscillator located underground in a shielded room. The central synchronizer is also referred to as the GNSS system clock, and the time referenced to the GNSS system clock is the GNSS system time.

Each GNSS satellite and each navigation receiver has its own local reference clock. The local reference clock in a receiver is typically a quartz oscillator, which can have variations in frequency and phase much greater than those of the GNSS system clock. The time referenced to a local clock in a receiver is also referred to as the receiver time scale. The clock in a satellite is typically an atomic clock, more stable than the clock in a receiver, but less stable than the GNSS system clock. The satellite clock is synchronized with the GNSS system clock via periodic measurement sessions made by the GNSS ground control complex. Results of these measurements are the corrections to the satellite clock; values of the corrections are uploaded to the satellite and are broadcast to users. Corrections to the satellite clock calculated by the ground control complex are not absolutely precise, however, because measurements and calculations can have particular errors and because the current drift of the satellite oscillator may not be well represented with the corrections calculated at some time in the past; consequently, there is an offset of the satellite time scale with respect to the GNSS system time.

The difference in time determined by a local clock in a receiver or satellite and the time determined by the GNSS system clock is referred to as the offset of the time scale or as the clock offset. Let $t_{GNSS}$, $t^j$, $t_B$, and $t_R$ represent the corresponding times measured by the GNSS system clock, the clock in the j-th GNSS satellite, the clock in the base receiver, and the clock in the rover receiver, respectively. Then:

$$\delta t^j = t^j - t_{GNSS} \tag{E1}$$

is the offset of the time scale of the j-th GNSS satellite with respect to the GNSS system time (also referred to as the j-th GNSS satellite clock offset);

$$\delta t_B = t_B - t_{GNSS} \quad (E2)$$

is the offset of the time scale of the base receiver with respect to the GNSS system time (also referred to as the base receiver clock offset);

$$\delta t_R = t_R - t_{GNSS} \quad (E3)$$

is the offset of the time scale of the rover receiver with respect to the GNSS system time (also referred to as the rover receiver clock offset); and $$\delta t_B - \delta t_R = (t_B - t_{GNSS}) - (t_R - t_{GNSS}) \quad (E4)$$
$$= t_B - t_R.$$

The carrier phase ambiguity is defined as follows. A harmonic carrier wave U(t) can be expressed as the function:

$$U(t) = A \cos(\omega t + \phi_0) = A[\Phi(t)]. \quad (E5)$$

Here:
A is the amplitude.
t is the time.
ω is the angular frequency, where $$\omega = 2\pi f = \frac{2\pi c}{\lambda},$$

f is the frequency, c is the magnitude of the phase velocity, and λ is the wavelength.

$\phi_0$, where ($\phi_0 < 2\pi$), is the initial phase at t=0.

Φ(t) is referred to herein as the full phase (also variously referred to as the phase, the total phase, the complete phase, or the argument).

Note that Φ(t) can be expressed as $$\Phi(t) = N(2\pi) + \phi(t), \quad (E6)$$

where:
N is an integer≥0; and
$\phi(t) < 2\pi$ is the fractional phase.

Since cos [N(2π)+φ(t)]=cos [φ(t)], N is referred to as the carrier phase ambiguity (also referred to as the carrier phase integer ambiguity, the integer ambiguity, or the ambiguity). Typically φ(t) is directly measured. Determining the value of N requires a more complex process, referred to as ambiguity resolution.

Assume for simplicity that a transmitter and a receiver are separated by free space, that the transmitter transmits the carrier wave at t=0 with $\phi_0$=0, and that the receiver receives the carrier wave at t=$t_r$ (times are referenced to a common system clock). If the full phase at t=$t_r$ is $\Phi(t_r) = N_r (2\pi) + \phi(t_r)$, then the distance between the transmitter and the receiver is $$S_{tr} = \lambda_0 \left[ \frac{\Phi(t_r)}{2\pi} \right] \quad (E7)$$
$$= N_r \lambda_0 + \left[ \frac{\phi(t_r)}{2\pi} \right] \lambda_0,$$

where $S_{tr}$ is the distance between the transmitter and the receiver, $N_r$ is the carrier phase ambiguity of the received carrier wave, $\phi(t_r)$ is the fractional phase of the received carrier wave, and $\lambda_0$ is the wavelength in free space of the received carrier wave.

The data processing algorithms are now described.

The term "first difference" is defined as follows. For an arbitrary variable [•], the first difference (also commonly referred to as "single difference") is calculated as follows:

$$\Delta[\bullet]^j = [\bullet]_B^j - [\bullet]_R^j. \quad (E8)$$

Here:
Δ is the first-difference operator.

$[\bullet]^j$ is the superscript index of a specific GNSS satellite, where j is an integer ranging from 1 to a maximum integer J. Various criteria can be used to set the maximum integer J. For example J can correspond to the number of satellites whose signals are received simultaneously by both the base and the rover.

$[\bullet]_B$ is the subscript index that refers to the base.
$[\bullet]_R$ is the subscript index that refers to the rover.
$[\bullet]_B^j$ is the value of [•] measured or computed with respect to the base and the j-th GNSS satellite.
$[\bullet]_R^j$ is the value of [•] measured or computed with respect to the rover and the j-th GNSS satellite.

The following first differences are calculated.

$$\Delta C^j = C_B^j - C_R^j \quad (E9)$$
$$= R_B^j - R_R^j + \Delta T^j + \Delta I^j + \Delta e^j + \Delta \tau^j + \Delta B_C + \Delta \xi^j;$$

and $$\Delta P^j = P_B^j - P_R^j \quad (E10)$$
$$= R_B^j - R_R^j + \Delta T^j - \Delta I^j + \Delta e^j + \Delta \tau^j + \Delta B_P + \Delta N^j \times$$
$$\lambda^i + \Delta \eta^j.$$

Here:
$C_B^j$ is the code phase measurement of the distance between the base and the j-th GNSS satellite made at the base with signals from the j-th GNSS satellite.

$C_R^j$ is the code phase measurement of the distance between the rover and the j-th GNSS satellite made at the rover with signals from the j-th GNSS satellite.

$\Delta C^j$ is the first difference of the code phase measurement.

$P_B^j$ is the carrier phase measurement of the distance between the base and the j-th GNSS satellite made at the base with signals from the j-th GNSS satellite.

$P_R^j$ is the carrier phase measurement of the distance between the rover and the j-th GNSS satellite made at the rover with signals from the j-th GNSS satellite.

$\Delta P^j$ is the first difference of the carrier phase measurement.

$R_B^j$ is the true distance between the base and the j-th GNSS satellite.

$R_R^j$ is the true distance between the rover and the j-th GNSS satellite.

$\Delta T^j = T_B^j - T_R^j$, where $T_B^j$ is the error in the distance measurement between the base and the j-th GNSS satellite resulting from the signal delay, due to the troposphere, between the base and the j-th GNSS satellite; and $T_R^j$ is the error in the distance measurement between the rover and the j-th GNSS satellite resulting from the signal delay, due to the troposphere, between the rover and the j-th GNSS satellite.

$\Delta I^j = I_B^j - I_R^j$, where $I_B^j$ is the error in the distance measurement between the base and the j-th GNSS satellite resulting from the signal delay, due to the ionosphere, between the base and the j-th GNSS satellite; and $I_R^j$ is the error in the distance measurement between the rover and the j-th GNSS satellite resulting from the signal delay, due to the ionosphere, between the rover and the j-th GNSS satellite.

$\Delta e^j = e_B^j - e_R^j$, where $e_B^j$ is the GNSS ephemeris error projection onto the line between the base and the j-th GNSS satellite; and $e_R^j$ is the GNSS ephemeris error projection onto the line between the rover and the j-th GNSS satellite.

$\Delta \tau^j = \tau_B^j - \tau_R^j$, where $\tau_B^j$ is the error in the distance measurement between the base and the j-th GNSS satellite resulting from the offset of the time scale of the j-th GNSS satellite with respect to the GNSS system time; and $\tau_R^j$ is the error in the distance measurement between the rover and the j-th GNSS satellite resulting from the offset of the time scale of the j-th GNSS satellite with respect to the GNSS system time.

$\Delta B_C$ is the sum of various biases common to the code phase measurement first difference of all GNSS satellites (that is, $\Delta B_C$ is the same for all GNSS satellites). Examples of such biases include the difference of receiver clock offsets and biases dependent on the receiver hardware.

$\Delta B_P$ is the sum of various biases common to the carrier phase measurement first difference of all GNSS satellites (that is, $\Delta B_P$ is the same for all GNSS satellites). Examples of such biases include the difference of receiver clock offsets between the base and the rover and biases dependent on the receiver hardware.

$\Delta N^j = N_B^j - N_R^j$ is the first difference of ambiguities, where $N_B^j$ is the carrier phase ambiguity of carrier phase measurements made at the base with signals from the j-th GNSS satellite; and $N_R^j$ is the carrier phase ambiguity of carrier phase measurements made at the rover with signals from the j-th GNSS satellite.

$\lambda^j$ is the wavelength of the carrier wave transmitted by the j-th GNSS satellite.

$\Delta \xi^j = \xi_B^j - \xi_R^j$, where $\xi_B^j$ is the error in the distance measurement between the base and the j-th GNSS satellite resulting from code phase measurement noise and code phase measurement multipath errors; and $\xi_R^j$ is the error in the distance measurement between the rover and the j-th GNSS satellite resulting from code phase measurement noise and code phase measurement multipath errors.

$\Delta \eta^j = \eta_B^j - \eta_R^j$, where $\eta_B^j$ is the error in the distance measurement between the base and the j-th GNSS satellite resulting from carrier phase measurement noise and carrier phase measurement multipath errors, and $\eta_R^j$ is the error in the distance measurement between the rover and the j-th GNSS satellite resulting from carrier phase measurement noise and carrier phase measurement multipath errors.

Many of the errors at the base and at the rover are strongly correlated for sufficiently short distances between the base and the rover. The distance between the base and the rover is referred to as the "baseline". At short baselines, the first differences of most of the errors, as well as the common biases, are zero. The equations (E9) and (E10) then simplify to:

$$\Delta C^j = C_B^j - C_R^j \quad (E11)$$
$$= R_B^j - R_R^j + \Delta B_C + \Delta \xi^j;$$

and $$\Delta P^j = P_B^j - P_R^j \quad (E12)$$
$$= R_B^j - R_R^j + \Delta B_P + \Delta N^j \times \lambda^j + \Delta \eta^j.$$

As the baseline between the base and the rover increases, the errors at the base and the rover become less correlated. Consequently, the equations (E9) and (E10) retain additional bias terms. The first differences are then expressed as:

$$\Delta C^j = C_B^j - C_R^j \quad (E13)$$
$$= R_B^j - R_R^j + \Delta B_C + \Delta b_C^j + \Delta \xi^j;$$

and $$\Delta P^j = P_B^j - P_R^j \quad (E14)$$
$$= R_B^j - R_R^j + \Delta B_P + \Delta N^j \times \lambda^j + \Delta b_P^j + \Delta \eta^j.$$

Here:
$\Delta \tau^j = 0$.
$\Delta b_C^j = \Delta T^j + \Delta I^j + \Delta e^j$ is the code phase bias for the first measurement difference made with respect to the j-th GNSS satellite.
$\Delta b_P^j = \Delta T^j - \Delta I^j + \Delta e^j$ is the carrier phase bias for the first measurement difference made with respect to the j-th GNSS satellite.

In order to be solved mathematically, equations (E11) and (E12), or equations (E13) and (E14), should be written in a form that includes only known and estimated parameters; hence, some biases and errors are omitted. The first differences are then expressed as:

$$\Delta C^j = C_B^j - C_R^j \quad (E15)$$
$$= \tilde{R}_B^j - \tilde{R}_R^j + \Delta B_C;$$

and $$\Delta P^j = P_B^j - P_R^j \quad (E16)$$
$$= \tilde{R}_B^j - \tilde{R}_R^j + \Delta B_P + \Delta N^j \times \lambda^j.$$

That is, (E15) and (E16) can serve as approximations to (E11) and (E12) or as approximations to (E13) and (E14). Here:

$\tilde{R}_B^j$ is an approximation to the true distance between the base and the j-th GNSS satellite. The value $\tilde{R}_B^j$ is calculated from the following equation:

$$\tilde{R}_B^j = \sqrt{(X^j - X_B)^2 + (Y^j - Y_B)^2 + (Z^j - Z_B)^2}. \quad (E17)$$

$\tilde{R}_R^j$ is an approximation to the true distance between the rover and the j-th GNSS satellite. The value $\tilde{R}_R^j$ is calculated from the following equation:

$$\tilde{R}_R^j = \sqrt{(X^j - X_R)^2 + (Y^j - Y_R)^2 + (Z^j - Z_R)^2}. \quad (E18)$$

$(X^j, Y^j, Z^j)$ are the Cartesian coordinates of the j-th GNSS satellite, computed based on satellite ephemeris data. [Note: The Cartesian coordinates of the j-th GNSS satellite, computed based on the satellite ephemeris data, have errors relative to the true coordinates of the satellite. Consequently, the value $\tilde{R}_B^j$ calculated from (E17) is an approximation to the true distance between the base and the j-th GNSS satellite.]

$(X_B,Y_B,Z_B)$ are the Cartesian coordinates of the base, known a priori.

$(X_R,Y_R,Z_R)$ are the Cartesian coordinates of the rover with respect to the position of the base in a specified reference frame evaluated as result of either an initial estimate or a previous solution. [Note: Precise values of the Cartesian coordinates of the rover are unknowns to be solved. The solution is iterative, and an initial estimate can be supplied by various methods. In one example, coordinates of the base $(X_B,Y_B,Z_B)$ can be used as an initial estimate of the coordinates of the rover. In other examples, an initial estimate of the coordinates of the rover can be read from a map or computed by the rover operating in a stand-alone GNSS mode.]

In summary, the equations (E15) and (E16) need to be solved within a system of equations in order to update the following unknowns with maximum precision:

$(X_R,Y_R,Z_R)$ are the coordinates of the rover with respect to the position of the base in a specified reference frame;

$\Delta B_C$ is the sum of various biases common to the code phase measurement first difference of all GNSS satellites;

$\Delta B_P$ is the sum of various biases common to the carrier phase measurement first difference of all GNSS satellites; and $\Delta N$ is the vector of the first difference of the carrier phase ambiguities.

Within the first-difference approach (algorithm), the biases $\Delta B_C$ and $\Delta B_P$ are to be evaluated as unknowns in addition to $(X_R,Y_R,Z_R)$. Determination of $\Delta N$ is the objective of the ambiguity resolution (AR) process.

The system of equations can also be solved with a second-difference approach (algorithm). In the second-difference approach, a specific GNSS satellite, the k-th GNSS satellite, is selected as a reference GNSS satellite. For an arbitrary variable [•], the second difference (also commonly referred to as the double difference) is calculated as follows:

$$\nabla\Delta[\cdot]^{k,j} = \Delta[\cdot]^k - \Delta[\cdot]^j \qquad (E19)$$
$$= ([\cdot]_B^k - [\cdot]_R^k) - ([\cdot]_B^j - [\cdot]_R^j)$$
$$= [\cdot]_B^k - [\cdot]_R^k - [\cdot]_B^j + [\cdot]_R^j.$$

Here, $\nabla\Delta$ is the second-difference operator. The second difference $\nabla\Delta[\cdot]^{k,j}$ is the difference between the single difference $\Delta[\cdot]^k = [\cdot]_B^k - [\cdot]_R^k$ computed with respect to the reference k-th GNSS satellite and the single difference $\Delta[\cdot]^j = [\cdot]_B^j - [\cdot]_R^j$ computed with respect to the j-th GNSS satellite.

At short baselines, the second differences computed from (E11) and (E12) are, respectively:

$$\nabla\Delta C^{k,j} = C_B^k - C_R^k - C_B^j + C_R^j \qquad (E20)$$
$$= R_B^k - R_R^k - R_B^j + R_R^j + \Delta B_C - \Delta B_C + \Delta\xi^k - \Delta\xi^j$$
$$= \nabla\Delta R^{k,j} + \nabla\Delta\xi^{k,j};$$

and $$\nabla\Delta P^{k,j} = P_B^k - P_R^k - P_B^j + P_R^j \qquad (E21)$$
$$= R_B^k - R_R^k - R_B^j + R_R^j + \Delta B_P - \Delta B_P + \Delta N^k \times \lambda^k -$$
$$\Delta N^j \times \lambda^j + \Delta\eta^k - \Delta\eta^j$$
$$= \nabla\Delta R^{k,j} + \Delta N^k \times \lambda^k - \Delta N^j \times \lambda^j + \nabla\Delta\eta^{k,j}.$$

At longer baselines, the second differences computed from (E13) and (E14) are, respectively:

$$\nabla\Delta C^{k,j} = C_B^k - C_R^k - C_B^j + C_R^j \qquad (E22)$$
$$= R_B^k - R_R^k - R_B^j + R_R^j + \Delta b_C^k - \Delta b_C^j + \Delta\xi^k - \Delta\xi^j$$
$$= \nabla\Delta R^{k,j} + \nabla\Delta b_C^{k,j} + \nabla\Delta\xi^{k,j};$$

and $$\nabla\Delta P^{k,j} = P_B^k - P_R^k - P_B^j + P_R^j \qquad (E23)$$
$$= R_B^k - R_R^k - R_B^j + R_R^j + \Delta N^k \times \lambda^k - \Delta N^j \times \lambda^j +$$
$$\Delta b_P^k - \Delta b_P^j + \Delta\eta^k - \Delta\eta^j$$
$$= \nabla\Delta R^{k,j} + \Delta N^k \times \lambda^k - \Delta N^j \times \lambda^j + \nabla\Delta b_P^{k,j} + \nabla\Delta\eta^{k,j}.$$

In order to be solved mathematically, equations (E20) and (E21), or equations (E22) and (E23), should be written in a form that includes only known and estimated parameters; hence, some biases and errors are omitted. The second differences are then expressed as:

$$\nabla\Delta C^{k,j} = C_B^k - C_R^k - C_B^j + C_R^j \qquad (E24)$$
$$= \nabla\Delta\tilde{R}^{k,j};$$

and $$\nabla\Delta P^{k,j} = P_B^k - P_R^k - P_B^j + P_R^j \qquad (E25)$$
$$= \nabla\Delta\tilde{R}^{k,j} + \Delta N^k \times \lambda^k - \Delta N^j \times \lambda^j.$$

That is, (E24) and (E25) can serve as approximations to (E20) and (E21) or as approximations to (E22) and (E23). Here:

$$\nabla\Delta\tilde{R}^{k,j} = (\tilde{R}_B^k - \tilde{R}_R^k) - (\tilde{R}_B^j - \tilde{R}_R^j). \qquad (E26)$$

In general, the carrier wavelength for each GNSS satellite can be different. In some GNSSs [such as GPS, which uses code division multiple access (CDMA)], the carrier wavelength for each GNSS satellite is the same, $\lambda^k = \lambda^j = \lambda$, for all k and all j, where $\lambda$ is the carrier wavelength in a specific frequency band (such as L1 or L2). In this case, equation (E25) can be written as:

$$\nabla\Delta P^{k,j} = P_B^k - P_R^k - P_B^j + P_R^j \qquad (E27)$$
$$= \nabla\Delta\tilde{R}^{k,j} + \nabla\Delta N^{k,j} \times \lambda.$$

In practice, ambiguity resolution in the real-time kinematic mode is mostly attempted at baselines no longer than 60 km. Within this range of baselines, the code phase biases in the first and the second differences ($\Delta b_C^j$ and $\nabla \Delta b_C^{k,j}$, respectively) that result from error decorrelation between the base and the rover are significantly less than the cumulative effect of code phase measurement noise and code phase measurement multipath errors in the first and second differences ($\Delta \xi^j$ and $\nabla \Delta \xi^{k,j}$, respectively). Consequently, in most applications, the residual code phase biases of the first and second differences can be ignored for position determination.

For baselines up to 60 km, however, the carrier phase biases in the first and second differences ($\Delta b_P^j$ and $\nabla \Delta b_P^{k,j}$, respectively) that result from error decorrelation between the base and the rover cannot be ignored. The presence of such biases makes the ambiguity resolution process difficult and time consuming. In some extreme cases, carrier phase biases can have values equal to or greater than half of the carrier wavelength, rendering ambiguity resolution impossible [for the GNSS L1 frequency band (1559-1610 MHz), the carrier wavelength in free space is ~19 cm].

The above equations can be solved in the real-time kinematic (RTK) mode or in the post-processing mode. In the RTK mode, the rover receives its GNSS measurements and the error correction data from the base and calculates the corrected position of the rover in real time. In the post-processing mode, the rover receives and stores its GNSS measurement data, and the base receives and stores its GNSS measurement data. The GNSS measurement data from the rover and the GNSS measurement data from the base can be transmitted to a computational system that can be located at an arbitrary site. The computational system can post-process the GNSS measurement data from the rover and the GNSS measurement data from the base to compute the position of the rover referenced to the previous time at which the GNSS measurement data from the rover and the GNSS measurement data from the base were collected.

A high-speed ambiguity resolution process is particularly advantageous in the RTK mode; for example, when GNSS measurements are used in a real-time control system. Embodiments of the ambiguity resolution process described below, however, can also be used in the post-processing mode. Furthermore, embodiments of the ambiguity resolution process described below can accommodate longer baselines in the post-processing mode than in the RTK mode. As discussed above, as the baseline increases, error decorrelation between the base and the rover increases, and the probability of correct ambiguity resolution decreases. More powerful computational systems and more processing time are available in the post-processing mode than in the RTK mode. The available increased computational power and increased processing time can accommodate longer baselines.

In practice, the carrier phase ambiguities are first evaluated as floating-point numbers. The actual carrier phase ambiguities, however, are integer numbers. Herein, a fix process refers to a process for determining integer values of carrier phase ambiguities from floating-point values of carrier phase ambiguities. Rather than arbitrarily rounding off the floating-point numbers to integer numbers, available candidate sets of integer numbers are evaluated on the basis of criteria, referred to as fix criteria, to determine the set of integer numbers that has the highest probability of being the correct set. Various fix criteria are known in the art; for example, refer to D. Milyutin and A. Plenkin, US Patent Application Publication No. 2011/0115669, "Detection and Correction of Anomalous Measurements and Ambiguity Resolution in a Global Navigation Satellite System". The integer values determined by the fix process are referred to as fixed ambiguities. Herein, ambiguity resolution refers to the overall process of resolving integer ambiguities; that is, ambiguity resolution includes evaluating floating-point values of carrier phase ambiguities and resolving integer ambiguities from the floating-point values via a fix process.

Code phase and carrier phase measurements are processed by a navigation receiver at discrete time instants referred to as measurement epochs. The time interval between two neighboring measurement epochs is referred to as the measurement epoch duration: $t_i = t_{i-1} + \Delta t$, where $t_i$ is the time instant of the current [i-th] measurement epoch, i is an integer, $t_{i-1}$ is the time instant of the previous [(i−1)-th] measurement epoch, and $\Delta t$ is the measurement epoch duration. For example, in many applications, a navigation receiver outputs data at intervals of 1 sec; in this case, the measurement epoch duration=1 sec. In some instances, particularly in automatic control systems, the navigation receiver outputs data at shorter intervals; for example, 0.1 sec (measurement epoch duration=0.1 sec) or 0.01 sec (measurement epoch duration=0.01 sec).

The ambiguity resolution process is generally not instantaneous; in practice, it could take from one through hundreds of measurement epochs to reach a reliable conclusion on the optimality of a specific candidate integer set. For the first-difference approach, the success of this process depends on the value of the bias $\Delta b_P^j$ present in (E14). For the second-difference approach, the success of this process depends on the value of the bias $\nabla \Delta b_P^{k,j}$ in (E23).

In an embodiment of the invention, a fixed solution is used to generate certain values, referred to as sub-corrections, that can improve the time-to-fix (TTF) if the fixed solution is lost during subsequent measurement epochs due to signal blockage, anomalous measurements, or other reasons. Herein a "fixed solution" (also referred to as a fixed position) refers to a rover position that has been computed with fixed ambiguities; a fixed solution has high accuracy according to specified probabilistic criteria. Herein, the time-to-fix refers to the time interval starting from the time instant when the conditions for starting the ambiguity resolution process are met to the time instant when the fixed solution is outputted. The conditions for starting the ambiguity resolution process are met when a minimum required number of code phase measurements and a minimum required number of carrier phase measurements from a minimum required number of satellites are available. The starting conditions depend on various conditions, such as the number of unknowns to be solved, the required accuracy, and previous experience with successful operations of ambiguity resolution algorithms.

Herein, the correction data generated at the base and transmitted to the rover is referred to as "basic corrections". "Sub-corrections" are generated at the rover in addition to the "basic corrections". Sub-corrections are always generated for measurements corrected with basic corrections: sub-corrections are never calculated in the absence of basic corrections.

In the RTK mode, if ambiguity resolution is not successful at a particular measurement epoch, then the floating-point values of the carrier phase ambiguities can be used to compute an estimate of the rover position; this estimate is referred to as the float solution or the float position. In the post-processing mode, if ambiguity resolution is not successful at a particular measurement epoch, then either a float solution or no solution is computed.

The algorithms for computing and applying sub-corrections are similar for the first-difference approach and for the second-difference approach; details vary, however. FIG. 6A-FIG. 6D show a flowchart of a method for a first-difference approach. FIG. 7A-FIG. 7D show a flowchart of a method for a second-difference approach. [Note: In flowcharts that extend over more than one sheet of drawings, break points are indicated by a capital letter enclosed by a hexagon. These break points are used strictly to assist the reader and are not steps in the flowcharts. Therefore, they are not described, and they are not assigned reference numbers.]

Figure 6A:
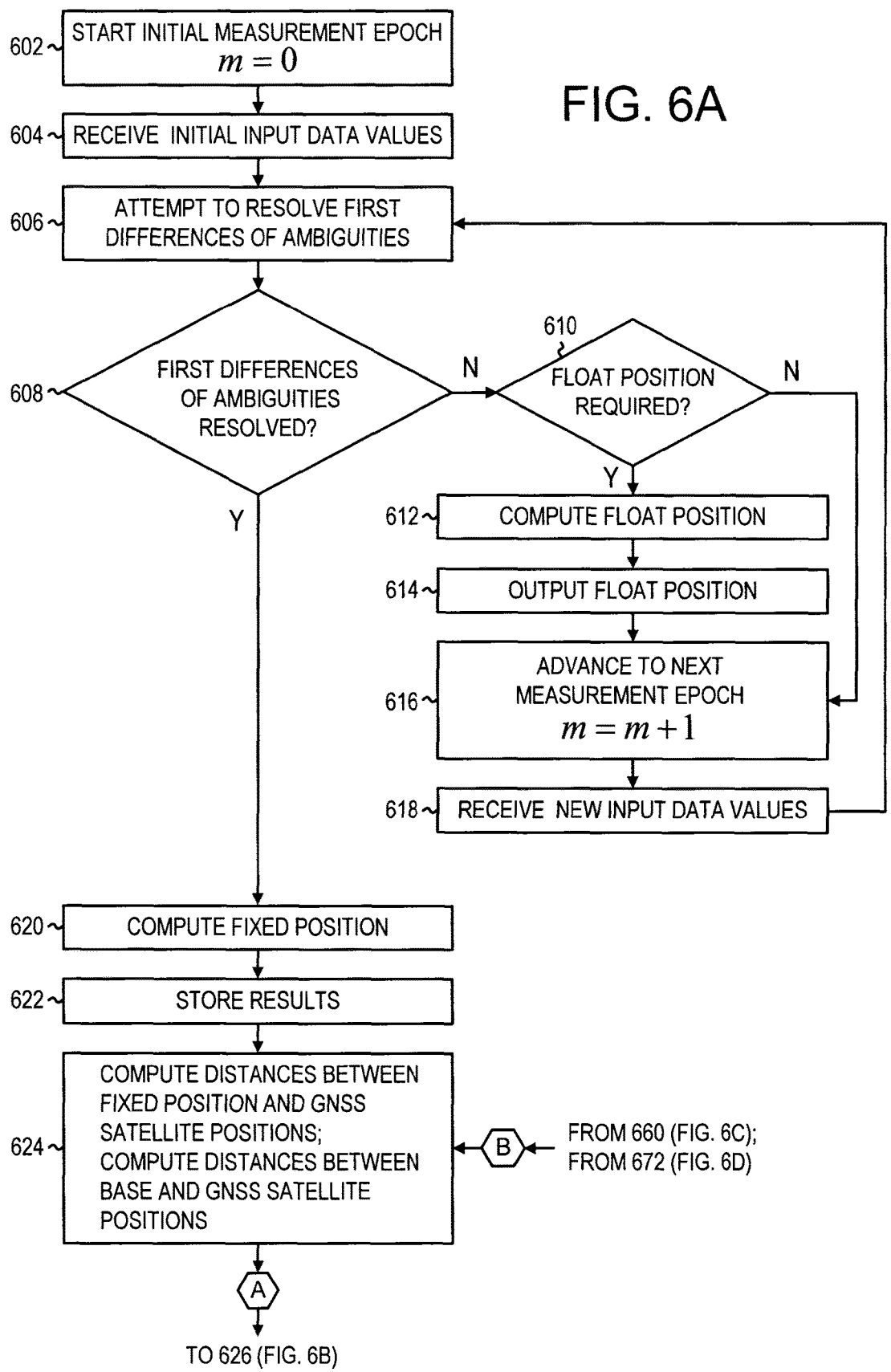

A method for a first-difference approach is first described. Refer to FIG. 6A. In step 602, the initial measurement epoch is started. Measurement epochs are indexed with the integer m. In step 602, the measurement epoch index is initialized with the value m=0. The process then passes to step 604, in which the following set of initial input data values (based on the code phase measurements and the carrier phase measurements for the initial measurement epoch) are received:
  $\Delta C^j$, the first difference of the code phase measurements from the j-th GNSS satellite
  $\Delta P^j$, the first difference of the carrier phase measurements from the j-th GNSS satellite
  $(X^j,Y^j,Z^j)$, the position of the j-th GNSS satellite
  $(X_B,Y_B,Z_B)$, the position of the base
  $(X_R,Y_R,Z_R)$, the approximate position of the rover
  $\lambda^j$, the wavelength of the carrier wave transmitted by the j-th GNSS satellite.
Here the index j ranges over the GNSS satellites for which first differences of code phase measurements and first differences of carrier phase measurements are available.

The process then passes to step 606, in which an attempt to resolve first differences of ambiguities is made. The process of ambiguity resolution includes verifying candidate ambiguity sets for consistency. Thus, the output of a successful ambiguity resolution process is a set of verified consistent first differences of ambiguities. Details of the verification process are described below. Any one of various known methods for ambiguity resolution can be used. The process then passes to the decision step 608. If the first differences of ambiguities are not resolved, then the process passes to the decision step 610. As discussed above, a float position is computed in the RTK mode and in some instances of the post-processing mode. As also discussed above, a float position refers to an approximate position of the rover computed from floating-point values, instead of integer values, of the ambiguities.

If a float position is not required, then the process passes to step 616, in which the measurement epoch is advanced to the next measurement epoch (m=m+1). The process then passes to step 618, in which a set of new input data values (updated based on the code phase measurements and the carrier phase measurements for the new measurement epoch) is received. The process then returns to step 606, in which in an attempt to resolve first differences of ambiguities with the new set of input data values is made.

Refer back to the decision step 610. If a float position is required, then the process passes to step 612, in which a float position is computed. The process then passes to step 614, in which the float position is outputted. The process then passes to step 616, described above.

Refer back to the decision step 608. If the first differences of ambiguities are resolved, then the process passes to step 620, in which the fixed position is computed. As described above, the fixed position refers to a precise position of the rover computed with the resolved ambiguities. The process then passes to step 622, in which the results are stored. The results include the resolved first differences of ambiguities and the fixed position.

The process then passes to step 624, in which the distances between the fixed position and the GNSS satellites are computed according to (E18) and the distances between the base and the GNSS satellites are computed according to (E17). The process then passes to step 626 (FIG. 6B), in which the first differences of the distances are computed according to (E8).

The process then passes to step 628, in which sub-corrections are computed according to the equation:

$$\Delta\delta^j = \Delta\tilde{R}^j - \Delta P^j - \Delta N^j \times \lambda^j - B_P, \qquad (E28)$$

where $\Delta\tilde{R}^j = \tilde{R}_B^j - \tilde{R}_R^j$.

The process then passes to the decision step 630. Since the sub-corrections are computed from carrier phase measurements, the sub-corrections themselves have errors resulting from the noise and the multipath errors in the carrier phase measurements. When the sub-corrections are applied to new carrier phase measurements, the cumulative noise and multipath errors increase. To diminish cumulative noise and multipath errors, smoothing can be applied to sub-corrections evaluated at each measurement epoch. The smoothing operation is optional.

If no smoothing of the sub-corrections is to be performed, then the process passes to step 632, in which the sub-corrections are stored. The process then passes to step 638, described below.

Refer back to the decision step 630. If smoothing of the sub-corrections is to be performed, then the process passes to step 634, in which the sub-corrections are smoothed. Smoothing can be performed with various algorithms. As one example, smoothing can be performed by averaging with equal weights:

$$\overline{\Delta\delta}_s^j = \overline{\Delta\delta}_{s-1}^j + (\Delta\delta_s^j - \overline{\Delta\delta}_{s-1}^j)/s. \qquad (E29)$$

Here:
  s is the index of an arbitrary measurement epoch, where $s \geq 1$.
  $\Delta\delta_s^j$ is the first-difference sub-correction at the s-th measurement epoch for the j-th GNSS satellite.
  $\overline{\Delta\delta}_s^j$ is the smoothed first-difference sub-correction at the s-th measurement epoch for the j-th GNSS satellite.
  $\overline{\Delta\delta}_{s-1}^j$ is the smoothed first-difference sub-correction at the (s−1)-th measurement epoch for the j-th GNSS satellite.

[Note: When the process passes through step 634 for the first time, then s=1, and sub-corrections for only the first measurement epoch are available. Estimation of $\overline{\Delta\delta}_{s-1}^j$ does not exist. Formally, however, the smoothing operation according to (E29) can still be performed for s=1, with the result $\overline{\Delta\delta}_1^j = \Delta\delta_1^j$.]

In an embodiment, if the index s exceeds a certain threshold (denoted as $s_L$), the divisor s in (E29) is fixed at the maximum value $s_L$, and (E29) transforms to (E30):

$$\overline{\Delta\delta}_s^j = \overline{\Delta\delta}_{s-1}^j + (\Delta\delta_s^j - \overline{\Delta\delta}_{s-1}^j)/s_L, \qquad (E30)$$

for $s > s_L$. The value of $s_L$ is a design choice; it can depend on a variety of different factors, such as receiver carrier phase noise, baseline distance, and rover dynamics. For example, if the update rate of (E29) or (E30) is 1 Hz, then values for $s_L$ can be 100 to 300. The process then passes to step 636, in which the smoothed sub-corrections are stored.

The process then passes to step 638, in which the counter index q is reset to the value q=1. The counter index q tracks the age of the sub-corrections. It is reset to the value of q=1 at every measurement epoch in which sub-corrections are updated; and it increments by +1 at every measurement epoch in which sub-corrections are not updated. See further discussion below.

The process then passes to step 640, in which the measurement epoch is advanced to the next measurement epoch, m=m+1. The process then passes to step 642, in which a set of new input data values (updated based on the code phase measurements and the carrier phase measurements for the new measurement epoch) is received. In an embodiment, the previously resolved set of first differences of ambiguities is used as a candidate set of first differences of ambiguities for the new measurement epoch, m=m+1. The process then passes to step 644, in which it is determined whether the previously resolved first differences of ambiguities can be verified for consistency for the new measurement epoch, m=m+1. In order to be verified for consistency, the number of new measurements should exceed the number of unknowns. For example, in one embodiment, the minimum number of measurements is five. The process then passes to the decision step 646 (FIG. 6C).

If the first differences of ambiguities cannot be verified for consistency, then the process passes to step 678 (FIG. 6D), in which an output solution is selected. Choices of the output solution include a fixed position computed with fixed ambiguities unverified for consistency, a float position computed with floating-point ambiguities, no solution, or other type of solution. Examples of other types of solution include standalone, code differential, and combined (obtained with a mix of floating-point and integer ambiguities). The process then passes to step 680, in which the selected solution is outputted. The process then passes to step 654, in which the counter index is updated, q=q+1. The process then returns to step 640 (FIG. 6B).

Refer back to the decision step 646 (FIG. 6C). If the first differences of ambiguities can be verified for consistency, then the process passes to step 656, in which the first differences of ambiguities are verified for consistency. Various methods can be used to verify the first differences of ambiguities for consistency. One method is described below.

The first differences of the measured carrier phases are computed, and these first differences are then corrected for the resolved ambiguities, thus producing new measurements $\Delta \hat{P}^j$ according to the equation:

$$\Delta \hat{P}^j = P_B{}^j - P_R{}^j - \Delta N^j \times \lambda^j. \tag{E31}$$

These new measurements are then provided as input to a standard procedure of position determination [for instance, the least-squares method (LSM)] to produce position estimates along with other unknowns (such as, $\Delta B_P$). The standard LSM solution produces residuals, which have a $\chi^2$-distribution under the assumption of a normal distribution for measurement errors. Thus, a normalized sum of squared residuals is checked against a $\chi^2$-threshold selected according to a specified confidence level. If the normalized sum of squared residuals is below the threshold, the ambiguities are considered consistent. If the normalized sum of squared residuals is equal to or above the threshold, the ambiguities are considered inconsistent.

The process then passes to the decision step 658. If the first differences of ambiguities are verified consistent, then the process passes to step 660, in which the fixed position (computed in step 656) is outputted. The process then returns to step 624 (FIG. 6A).

Refer back to the decision step 658 (FIG. 6C). If the first differences of ambiguities are not verified consistent, then the process passes to the decision step 662. As the interval during which a fixed solution was not available and during which the sub-corrections were not updated increases, the effectiveness of the sub-corrections decreases due to decorrelation of measurement errors in the time domain; that is, the sub-corrections get aged, and the effectiveness of the sub-corrections decreases with age. To account for the age of the sub-corrections, an aging operation can be performed; details of the aging operation are discussed below. The aging operation can be performed on sub-corrections or smoothed sub-corrections. The aging operation is optional.

If the aging operation is not performed, then the process passes to step 664, in which the sub-corrections or smoothed sub-corrections are applied to the carrier phase measurements. If no smoothing was performed, the sub-corrections are applied to the carrier phase first differences according to the following equation:

$$\Delta \hat{P}_{m+q}{}^j = \Delta P_{m+q}{}^j + \Delta \delta_m{}^j. \tag{E32}$$

Here:
$\Delta P_{m+q}{}^j$ are the uncorrected carrier phase first differences at the (m+q)-th epoch.
$\Delta \hat{P}_{m+q}{}^j$ are the carrier phase first differences, corrected with the sub-corrections, at the (m+q)-th epoch.
$\Delta \delta_m{}^j$ are the sub-corrections generated at the m-th epoch.

If smoothing was performed, the smoothed sub-corrections are applied to the carrier phase first differences according to the following equation:

$$\Delta \hat{P}_{m+q}{}^j = \Delta P_{m+q}{}^j + \overline{\Delta \delta}_m{}^j. \tag{E33}$$

Here:
$\Delta P_{m+q}{}^j$ are the uncorrected carrier phase first differences at the (m+q)-th epoch.
$\Delta \hat{P}_{m+q}{}^j$ are the carrier phase first differences, corrected with the smoothed sub-corrections, at the (m+q)-th epoch.
$\overline{\Delta \delta}_m{}^j$ are the smoothed sub-corrections generated at the m-th epoch.

The process then passes to step 666 (FIG. 6D), in which the corrected carrier phase first differences $\Delta \hat{P}_{m+q}{}^j$ are used to attempt to resolve first differences of ambiguities. The process then passes to the decision step 668. If the first differences of ambiguities are resolved, then the process passes to step 670, in which a new fixed solution is computed based on the corrected carrier phase first differences $\Delta \hat{P}_{m+q}{}^j$ and the resolved first differences of ambiguities. The process then passes to step 672, in which the fixed position is outputted. The process then returns to step 624 (FIG. 6A).

Figure 6D:
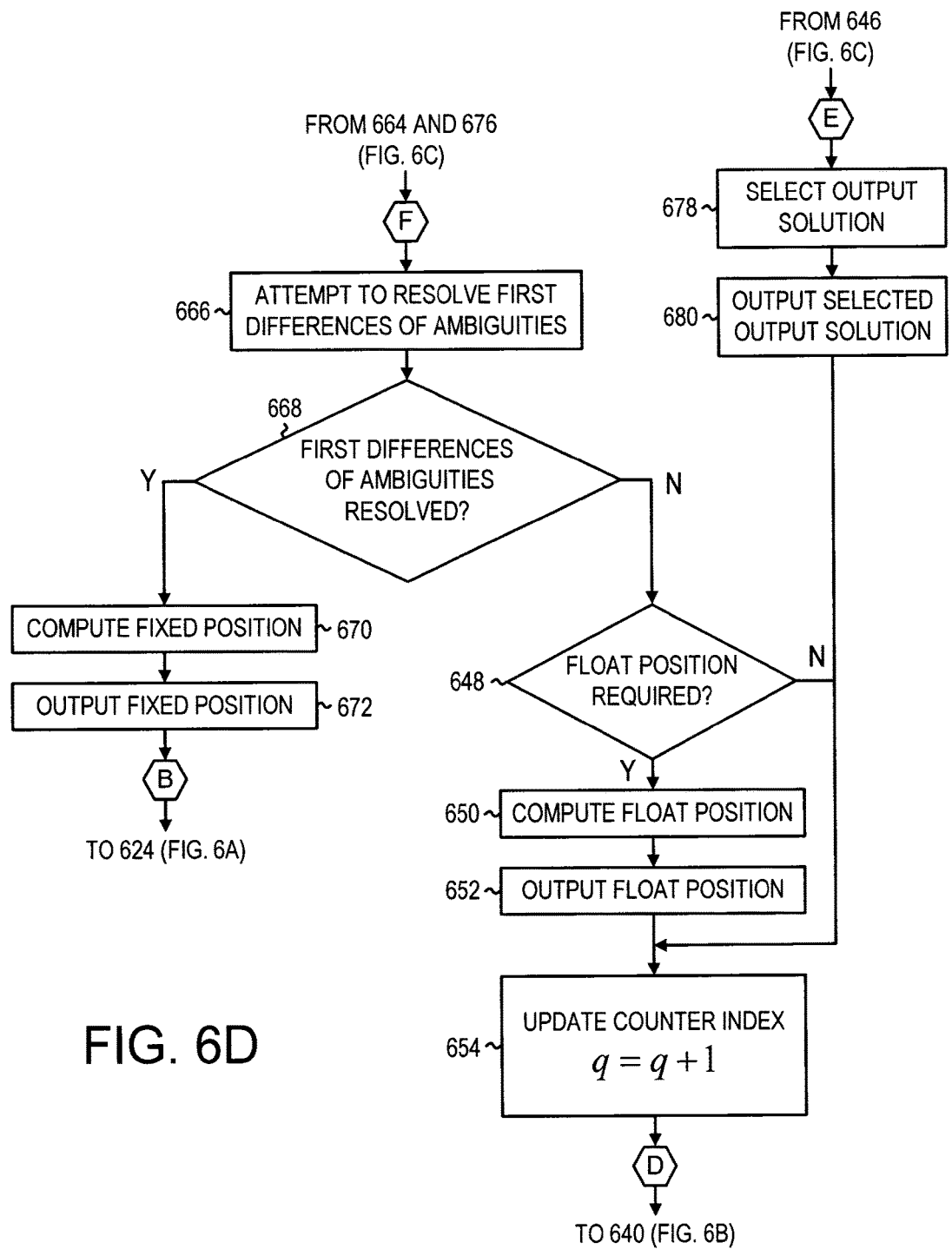

Refer back to the decision step 668 (FIG. 6D). If the first differences of ambiguities are not resolved, then the process passes to the decision step 648. If no float position is required, then the process passes to step 654, described above. If a float position is required, then the process passes to step 650, in which a float position is computed. The process then passes to step 652, in which the float position is outputted. The process then passes to step 654, described above.

Refer back to the decision step 662 (FIG. 6C). If the aging operation is performed, then the process passes to step 674. The sub-corrections or smoothed sub-corrections are weighted with an age-dependent coefficient such that the weighted sub-corrections or weighted smoothed sub-corrections decrease with time; for example, the sub-corrections or smoothed sub-corrections can be multiplied by coefficients that monotonically decrease with time.

In one embodiment, if sub-corrections are used, the sub-corrections are multiplied by coefficients exponentially decreasing in time:

$$\Delta\delta_{m+q}^{j} = \Delta\delta_{m}^{j} \times e^{-(t_{m+q}-t_{m})/\tau_{a}}. \quad (E34)$$

Here:
- m is the index of the measurement epoch when the sub-corrections were generated. The sub-corrections were generated at the latest measurement epoch when a verified consistent fixed solution was available.
- q is the number of measurement epochs, elapsed since the m-th measurement epoch; during these q measurement epochs, a new verified consistent fixed solution was not computed and sub-corrections were not updated. $t_m$ is the time instant when the sub-corrections were generated.
- $t_{m+q}$ is the time instant when the sub-corrections are applied.
- $\tau_a$ is a specified aging time constant.
- $\Delta\delta_m^j$ are the sub-corrections, generated at the time instant $t_m$.
- $\Delta\delta_{m+q}^j$ are the sub-corrections, aged to the time instant of application $t_{m+q}$.

In one embodiment, if smoothed sub-corrections are used, the smoothed sub-corrections are multiplied by coefficients exponentially decreasing in time:

$$\overline{\Delta\delta}_{m+q}^{j} = \overline{\Delta\delta}_{m}^{j} \times e^{-(t_{m+q}-t_{m})/\tau_{a}}. \quad (E35)$$

Here:
- m is the index of the measurement epoch when the smoothed sub-corrections were generated. The smoothed sub-corrections were generated at the latest measurement epoch when a verified consistent fixed solution was available.
- q is the number of measurement epochs, elapsed since the m-th measurement epoch; during these q measurement epochs, a new verified consistent fixed solution was not computed and smoothed sub-corrections were not updated.
- $t_m$ is the time instant when the smoothed sub-corrections were generated.
- $t_{m+q}$ is the time instant when the smoothed sub-corrections are applied.
- $\tau_a$ is a specified aging time constant.
- $\overline{\Delta\delta}_m^j$ are the sub-corrections, generated at the time instant $t_m$.
- $\overline{\Delta\delta}_{m+q}^j$ are the sub-corrections, aged to the time instant of application $t_{m+q}$.

The process then passes to step 676. If no smoothing was performed, the aged sub-corrections are applied to the carrier phase first differences according to the following equation:

$$\Delta\hat{P}_{m+q}^{j} = \Delta P_{m+q}^{j} + \Delta\delta_{m+q}^{j}. \quad (E36)$$

Here:
- $\Delta P_{m+q}^j$ are the uncorrected carrier phase first differences at the (m+q)-th epoch.
- $\Delta\hat{P}_{m+q}^j$ are the carrier phase first differences, corrected with the aged sub-corrections, at the (m+q)-th epoch.
- $\Delta\delta_{m+q}^j$ are the aged sub-corrections generated at the m-th epoch and aged to the (m+q)-th epoch.

If smoothing was performed, the aged smoothed sub-corrections are applied to the carrier phase first differences according to the following equation:

$$\Delta\hat{P}_{m+q}^{j} = \Delta P_{m+q}^{j} + \overline{\Delta\delta}_{m+q}^{j}. \quad (E37)$$

Here:
- $\Delta P_{m+q}^j$ are the uncorrected carrier phase first differences at the (m+q)-th epoch.
- $\Delta\hat{P}_{m+q}^j$ are the carrier phase first differences, corrected with the aged smoothed sub-corrections, at the (m+q)-th epoch.
- $\overline{\Delta\delta}_{m+q}^j$ are the aged smoothed sub-corrections generated at the m-th epoch and aged to the (m+q)-th epoch.

The process then passes to step 666 (FIG. 6D), described above.

Figure 7A:
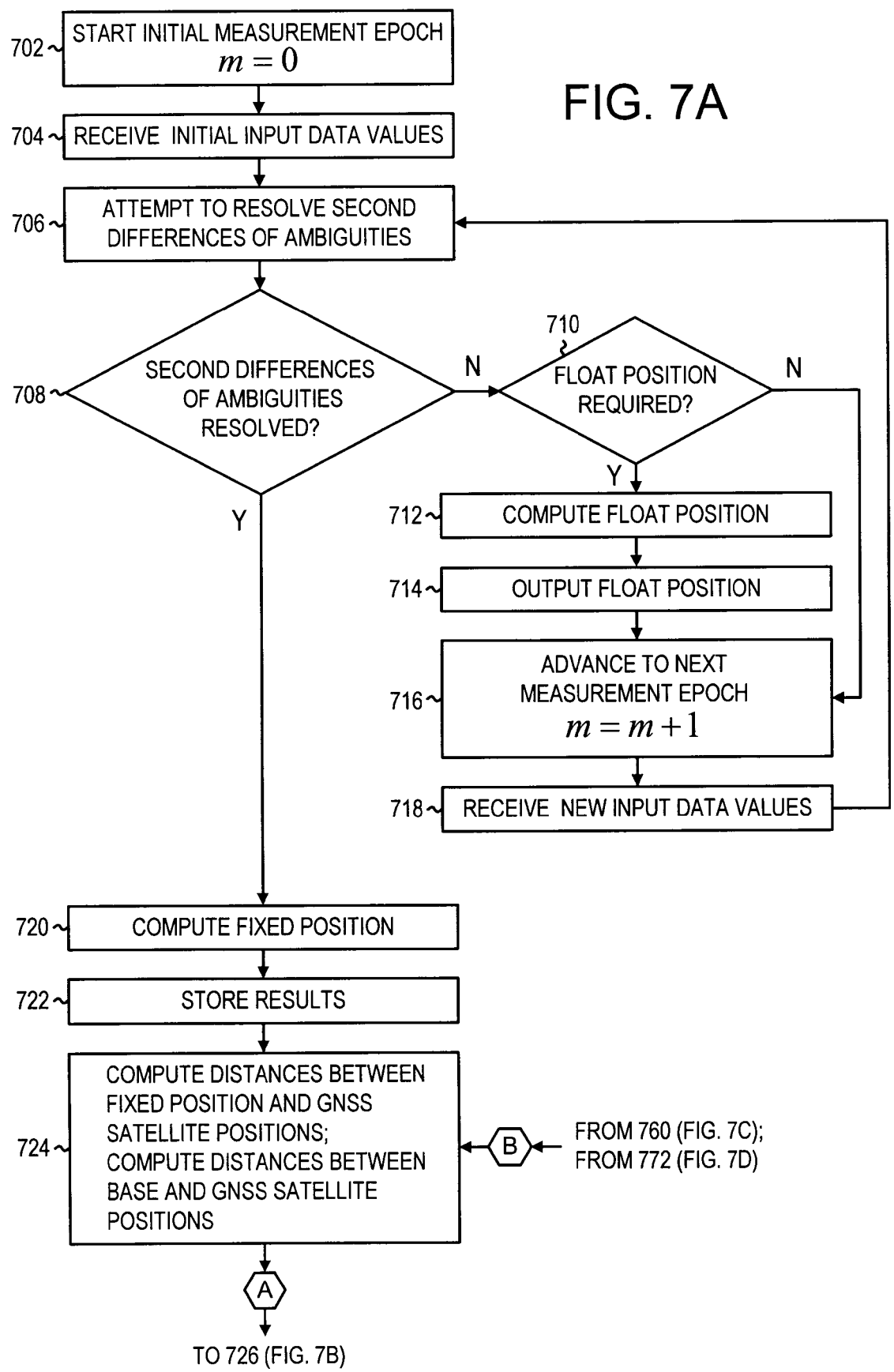
FIG. 7A-FIG. 7D show a flowchart of a method for second-difference sub-corrections.

A method for a second-difference approach is now described. Refer to FIG. 7A. In step 702, the initial measurement epoch is started. Measurement epochs are indexed with the integer m. In step 702, the measurement epoch index is initialized with the value m=0. The process then passes to step 704, in which the following set of initial input data values (based on the code phase measurements and the carrier phase measurements for the initial measurement epoch) are received:
- $\nabla\Delta C^{k,j}$, the second difference of the code phase measurements [the difference between the single difference of the code phase measurements computed from the reference k-th GNSS satellite and the single difference of the code phase measurements computed from the j-th GNSS satellite]
- $\nabla\Delta P^{k,j}$, the second difference of the carrier phase measurements [the difference between the single difference of the carrier phase measurements computed from the reference k-th GNSS satellite and the single difference of the carrier phase measurements computed from the j-th GNSS satellite]
- $(X^j, Y^j, Z^j)$, the position of the j-th GNSS satellite
- $(X_B, Y_B, Z_B)$, the position of the base
- $(X_R, Y_R, Z_R)$, the approximate position of the rover
- $\lambda^j$, the wavelength of the carrier wave transmitted by the j-th GNSS satellite.

Here the index j ranges over the GNSS satellites for which first differences of code phase measurements and first differences of carrier phase measurements are available; the range of j includes k.

The process then passes to step 706, in which an attempt to resolve second differences of ambiguities is made. The process of ambiguity resolution includes verifying candidate ambiguity sets for consistency. Thus, the output of a successful ambiguity resolution process is a set of verified consistent second differences of ambiguities. Details of the verification process are described below. Any one of various known methods for ambiguity resolution can be used. The process then passes to the decision step 708. If the second differences of ambiguities are not resolved, then the process passes to the decision step 710. As discussed above, a float position is computed in the RTK mode and in some instances of the post-processing mode. As also discussed above, a float position refers to an approximate position of the rover computed from floating-point values, instead of integer values, of the ambiguities.

If a float position is not required, then the process passes to step 716, in which the measurement epoch is advanced to the next measurement epoch (m=m+1). The process then passes to step 718, in which a set of new input data values (updated based on the code phase measurements and the carrier phase measurements for the new measurement epoch) is received. The process then returns to step 706, in which in an attempt to resolve second differences of ambiguities with the new set of input data values is made.

Refer back to the decision step 710. If a float position is required, then the process passes to step 712, in which a float position is computed. The process then passes to step 714, in which the float position is outputted. The process then passes to step 716, described above.

Refer back to the decision step 708. If the second differences of ambiguities are resolved, then the process passes to step 720, in which the fixed position is computed. As described above, the fixed position refers to a precise position of the rover computed with the resolved ambiguities. The process then passes to step 722, in which the results are stored. The results include the resolved second differences of ambiguities and the fixed position.

The process then passes to step 724, in which the distances between the fixed position and the GNSS satellites are computed according to (E18) and the distances between the base and the GNSS satellites are computed according to (E17). The process then passes to step 726 (FIG. 7B), in which the second differences of the distances are computed according to (E19).

The process then passes to step 728, in which sub-corrections are computed according to the equation:

$$\nabla\Delta\delta^{k,j} = \nabla\Delta\tilde{R}^{k,j} - \nabla\Delta P^{k,j} + \Delta N^k \times \lambda^k - \Delta N^j \times \lambda^j, \quad (E38)$$
where $\Delta\tilde{R}^{k,j} = \tilde{R}_B^k - \tilde{R}_R^k - \tilde{R}_B^j + \tilde{R}_R^j$.

The process then passes to the decision step 730. Since the sub-corrections are computed from carrier phase measurements, the sub-corrections themselves have errors resulting from the noise and the multipath errors in the carrier phase measurements. When the sub-corrections are applied to new carrier phase measurements, the cumulative noise and multipath errors increase. To diminish cumulative noise and multipath errors, smoothing can be applied to sub-corrections evaluated at each measurement epoch. The smoothing operation is optional.

If no smoothing of the sub-corrections is to be performed, then the process passes to step 732, in which the sub-corrections are stored. The process then passes to step 738, described below.

Refer back to the decision step 730. If smoothing of the sub-corrections is to be performed, then the process passes to step 734, in which the sub-corrections are smoothed. Smoothing can be performed with various algorithms. As one example, smoothing can be performed by averaging with equal weights:

$$\overline{\nabla\Delta\delta}_s^{k,j} = \overline{\nabla\Delta\delta}_{s-1}^{k,j} + (\nabla\Delta\delta_s^{k,j} - \overline{\nabla\Delta\delta}_{s-1}^{k,j})/s. \quad (E39)$$

Here:
  s is the index of an arbitrary measurement epoch, where $s \geq 1$.
  $\nabla\Delta\delta_s^{k,j}$ is the second-difference sub-correction at the s-th measurement epoch for the j-th GNSS satellite and the k-th GNSS reference satellite.
  $\overline{\nabla\Delta\delta}_s^{k,j}$ is the smoothed second-difference sub-correction at the s-th measurement epoch for the j-th GNSS satellite and the k-th GNSS reference satellite.
  $\overline{\nabla\Delta\delta}_{s-1}^{k,j}$ is the smoothed second-difference sub-correction at the (s−1)-th measurement epoch for the j-th GNSS satellite and the k-th GNSS reference satellite.
  [Note: When the process passes through step 734 for the first time, then s=1, and sub-corrections for only the first measurement epoch are available. Estimation of $\overline{\nabla\Delta\delta}_{s-1}^{k,j}$ does not exist. Formally, however, the smoothing operation according to (E39) can still be performed for s=1, with the result $\overline{\nabla\Delta\delta}_1^{k,j} = \nabla\Delta\delta_1^{k,j}$.]

In an embodiment, if the index s exceeds a certain threshold (denoted as $s_L$), the divisor s in (E39) is fixed at the maximum value $s_L$, and (E39) transforms to (E40):

$$\overline{\nabla\Delta\delta}_s^{k,j} = \overline{\nabla\Delta\delta}_{s-1}^{k,j} + (\nabla\Delta\delta_s^{k,j} - \overline{\nabla\Delta\delta}_{s-1}^{k,j})/s_L, \quad (E40)$$

for $s > s_L$. The value of $s_L$ is a design choice; it can depend on a variety of different factors, such as receiver carrier phase noise, baseline distance, and rover dynamics. For example, if the update rate of (E39) or (E40) is 1 Hz, then values for $s_L$ can be 100 to 300. The process then passes to step 736, in which the smoothed sub-corrections are stored.

The process then passes to step 738, in which the counter index q is reset to the value q=1. The counter index q tracks the age of the sub-corrections. It is reset to the value of q=1 at every measurement epoch in which sub-corrections are updated; and it increments by +1 at every measurement epoch in which sub-corrections are not updated. See further discussion below.

The process then passes to step 740, in which the measurement epoch is advanced to the next measurement epoch, m=m+1. The process then passes to step 742, in which a set of new input data values (updated based on the code phase measurements and the carrier phase measurements for the new measurement epoch) is received. In an embodiment, the previously resolved set of second differences of ambiguities is used as a candidate set of second differences of ambiguities for the new measurement epoch, m=m+1. The process then passes to step 744, in which it is determined whether the previously resolved second differences of ambiguities can be verified for consistency for the new measurement epoch, m=m+1. In order to be verified for consistency, the number of new measurements should exceed the number of unknowns. For example, in one embodiment, the minimum number of measurements is five. The process then passes to the decision step 746 (FIG. 7C).

Figure 7B:
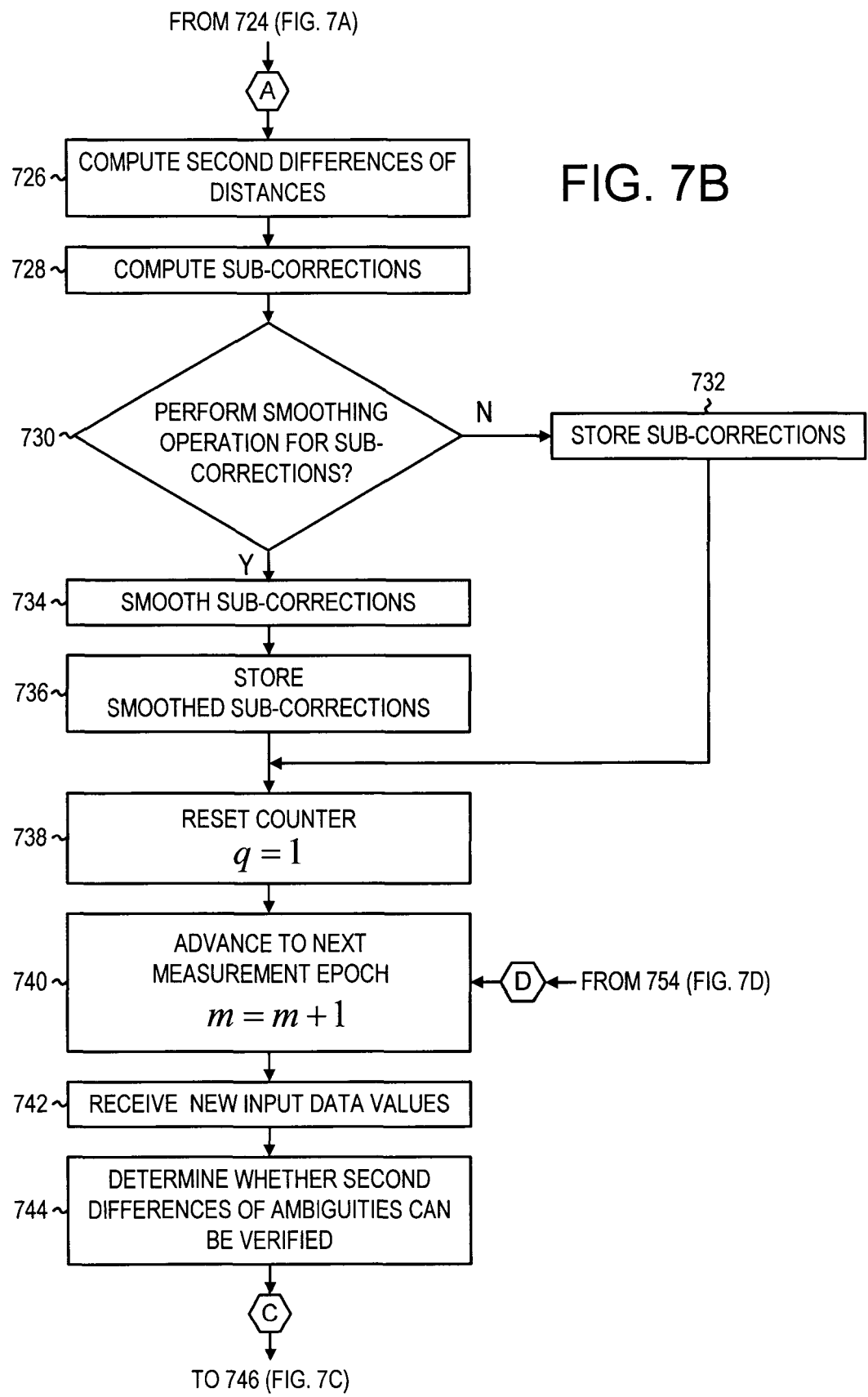

If the second differences of ambiguities cannot be verified for consistency, then the process passes to step 778 (FIG. 7D), in which an output solution is selected. Choices of the output solution include a fixed position computed with fixed ambiguities unverified for consistency, a float position computed with floating-point ambiguities, no solution, or other type of solution. Examples of other types of solution include stand-alone, code differential, and combined (obtained with a mix of floating-point and integer ambiguities). The process then passes to step 780, in which the selected solution is outputted. The process then passes to step 754, in which the counter index is updated, q=q+1. The process then returns to step 740 (FIG. 7B).

Figure 7C:
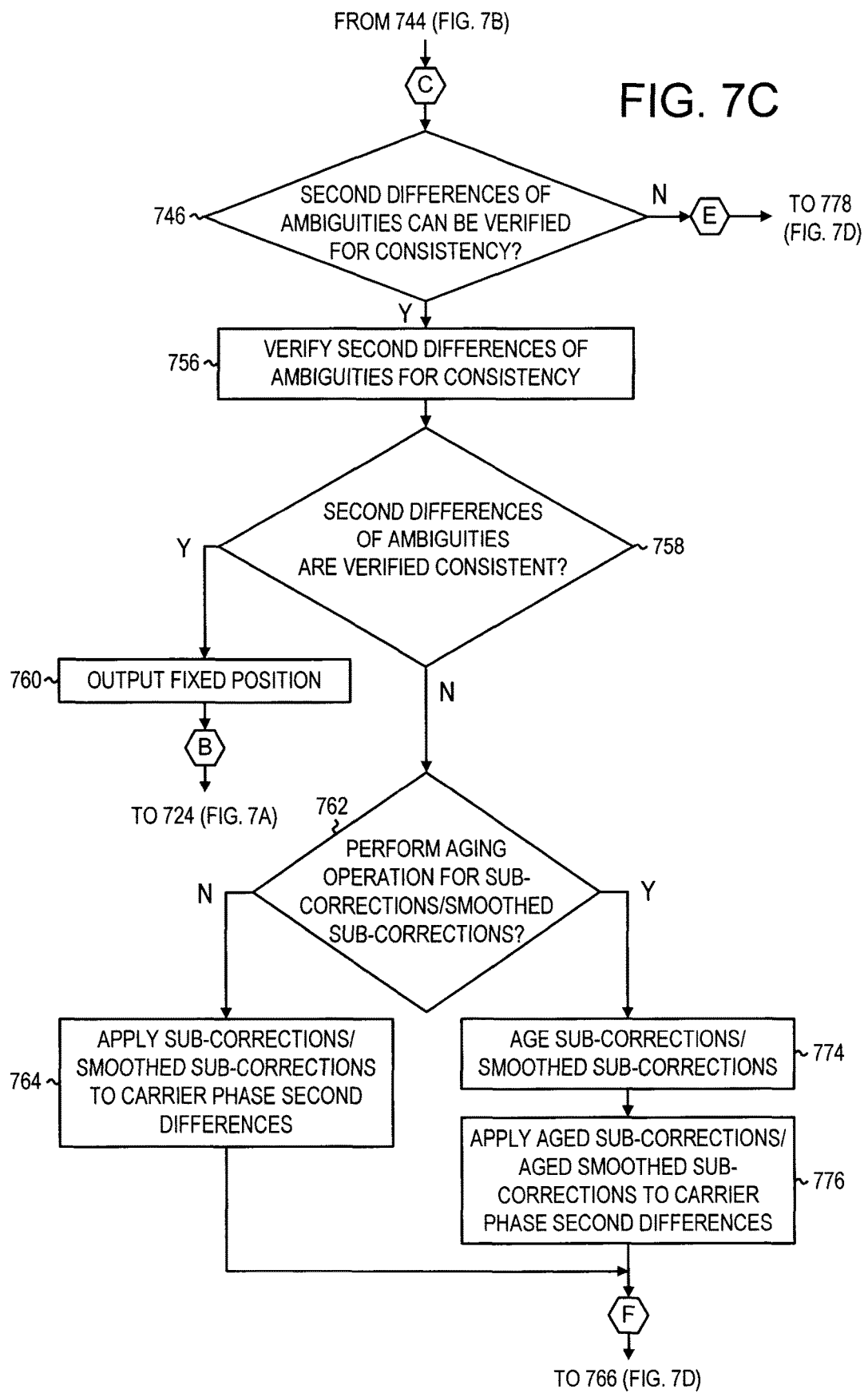

Refer back to the decision step 746 (FIG. 7C). If the second differences of ambiguities can be verified for consistency, then the process passes to step 756, in which the second differences of ambiguities are verified for consistency. Various methods can be used to verify the ambiguities for consistency. One method is described below.

The second differences of the measured carrier phases are computed, and these second differences are then corrected for the resolved ambiguities, thus producing new measurements $\nabla\Delta\hat{P}^{k,j}$ according to the equation:

$$\nabla\Delta\hat{P}^{k,j} = P_B^k - P_R^k - P_B^j + P_R^j + \Delta N^k \times \lambda^k - \Delta N^j \times \lambda^j. \quad (E41)$$

These new measurements are then provided as input to a standard procedure of position determination [for instance, the least-squares method (LSM)] to produce position estimates. The standard LSM solution produces residuals, which have a $\chi^2$-distribution under the assumption of a normal distribution for measurement errors. Thus, a normalized sum of squared residuals is checked against a $\chi^2$-threshold selected according to a specified confidence level. If the normalized sum of squared residuals is below the threshold, the ambiguities are considered consistent. If the normalized sum of squared residuals is equal to or above the threshold, the ambiguities are considered inconsistent.

The process then passes to the decision step 758. If the second differences of ambiguities are verified consistent, then the process passes to step 760, in which the fixed position (computed in step 756) is outputted. The process then returns to step 724 (FIG. 7A).

Refer back to the decision step 758 (FIG. 7C). If the second differences of ambiguities are not verified consistent, then the process passes to the decision step 762. As the interval during which a fixed solution was not available and during which the sub-corrections were not updated increases, the effectiveness of the sub-corrections decreases due to decorrelation of measurement errors in the time domain; that is, the sub-corrections get aged, and the effectiveness of the sub-corrections decreases with age. To account for the age of the sub-corrections, an aging operation can be performed; details of the aging operation are discussed below. The aging operation can be performed on sub-corrections or smoothed sub-corrections. The aging operation is optional.

If the aging operation is not performed, then the process passes to step 764, in which the sub-corrections or smoothed sub-corrections are applied to the carrier phase measurements. If no smoothing was performed, the sub-corrections are applied to the carrier phase second differences according to the following equation:

$$\nabla\Delta\hat{P}_{m+q}^{k,j} = \nabla\Delta P_{m+q}^{k,j} + \nabla\Delta\delta_m^{k,j}. \tag{E42}$$

Here:
$\nabla\Delta P_{m+q}^{k,j}$ are the uncorrected carrier phase second differences at the (m+q)-th epoch.
$\nabla\Delta\hat{P}_{m+q}^{k,j}$ are the carrier phase second differences, corrected with the sub-corrections, at the (m+q)-th epoch.
$\nabla\Delta\delta_m^{k,j}$ are the sub-corrections generated at the m-th epoch.

If smoothing was performed, the smoothed sub-corrections are applied to the carrier phase first differences according to the following equation:

$$\nabla\Delta\hat{P}_{m+q}^{k,j} = \nabla\Delta P_{m+q}^{k,j} + \overline{\nabla\Delta\delta}_m^{k,j}. \tag{E43}$$

Here:
$\nabla\Delta P_{m+q}^{j}$ are the uncorrected carrier phase second differences at the (m+q)-th epoch.
$\nabla\Delta\hat{P}_{m+q}^{k,j}$ are the carrier phase second differences, corrected with the smoothed sub-corrections, at the (m+q)-th epoch.
$\overline{\nabla\Delta\delta}_m^{k,j}$ are the smoothed sub-corrections generated at the m-th epoch.

The process then passes to step 766 (FIG. 7D), in which the corrected carrier phase first differences $\nabla\Delta\hat{P}_{m+q}^{k,j}$ are used to attempt to resolve second differences of ambiguities. The process then passes to the decision step 768. If the second differences of ambiguities are resolved, then the process passes to step 770, in which a new fixed solution is computed based on the corrected carrier phase second differences $\nabla\Delta\hat{P}_{m+q}^{k,j}$ and the resolved second differences of ambiguities. The process then passes to step 772, in which the fixed position is outputted. The process then returns to step 724 (FIG. 7A).

Figure 7D:
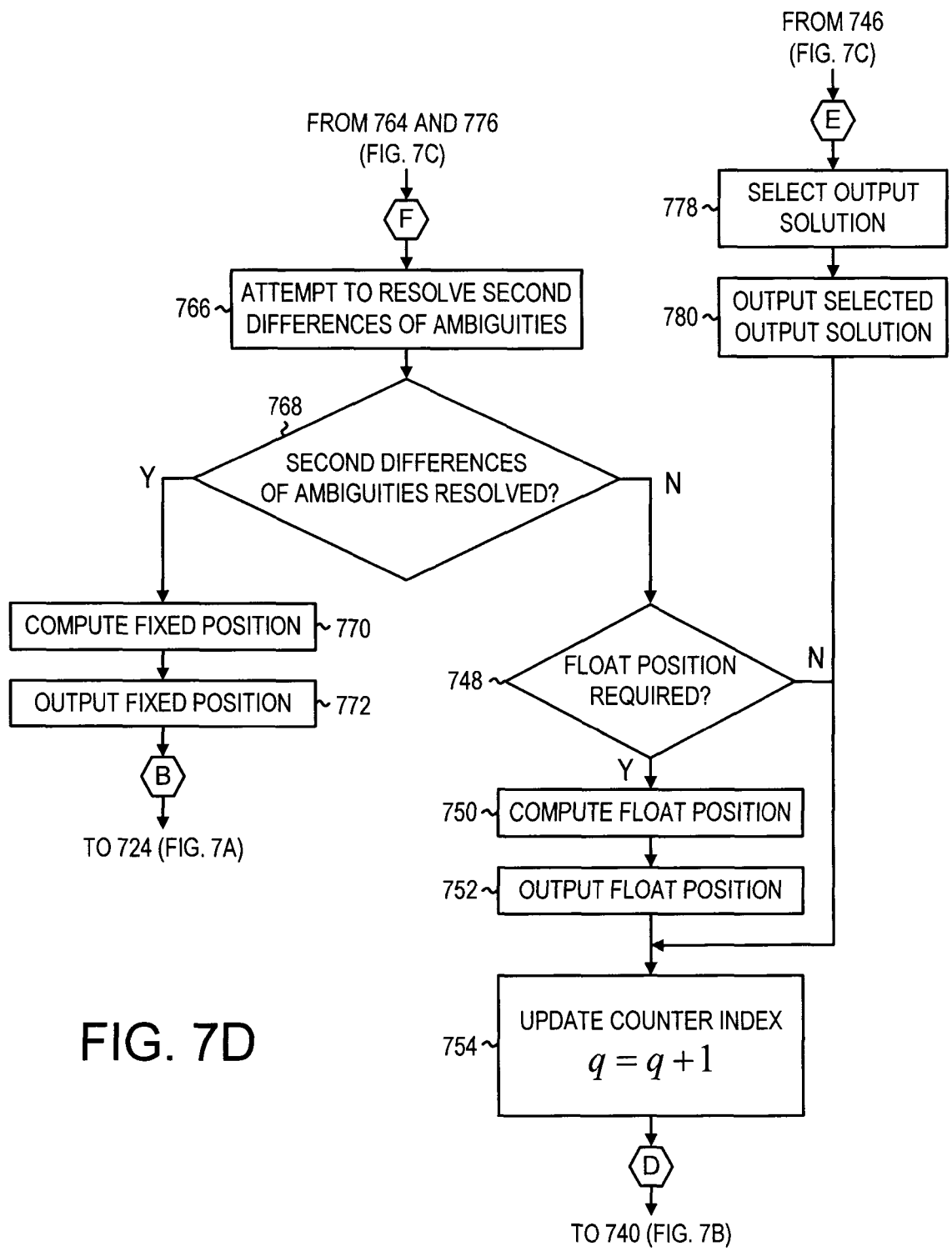

Refer back to the decision step 768 (FIG. 7D). If the second differences of ambiguities are not resolved, then the process passes to the decision step 748. If no float position is required, then the process passes to step 754, described above. If a float position is required, then the process passes to step 750, in which a float position is computed. The process then passes to step 752, in which the float position is outputted. The process then passes to step 754, described above.

Refer back to the decision step 762 (FIG. 7C). If the aging operation is performed, then the process passes to step 774. The sub-corrections or smoothed sub-corrections are weighted with an age-dependent coefficient such that the weighted sub-corrections or weighted smoothed sub-corrections decrease with time; for example, the sub-corrections or smoothed sub-corrections can be multiplied by coefficients that monotonically decrease with time.

In one embodiment, if sub-corrections are used, the sub-corrections are multiplied by coefficients exponentially decreasing in time:

$$\nabla\Delta\delta_{m+q}^{k,j} = \nabla\Delta\delta_m^{k,j} \times e^{-(t_{m+q}-t_m)/\tau_a}. \tag{E44}$$

Here:
m is the index of the measurement epoch when the sub-corrections were generated. The sub-corrections were generated at the latest measurement epoch when a verified consistent fixed solution was available.
q is the number of measurement epochs, elapsed since the m-th measurement epoch; during these q measurement epochs, a new verified consistent fixed solution was not computed and sub-corrections were not updated.
$t_m$ is the time instant when the sub-corrections were generated.
$t_{m+q}$ is the time instant when the sub-corrections are applied.
$\tau_a$ is a specified aging time constant.
$\nabla\Delta\delta_m^{k,j}$ are the sub-corrections, generated at the time instant $t_m$.
$\nabla\Delta\delta_{m+q}^{k,j}$ are the sub-corrections, aged to the time instant of application $t_{m+q}$.

In one embodiment, if smoothed sub-corrections are used, the smoothed sub-corrections are multiplied by coefficients exponentially decreasing in time:

$$\overline{\nabla\Delta\delta}_{m+q}^{k,j} = \overline{\nabla\Delta\delta}_m^{k,j} \times e^{-(t_{m+q}-t_m)\tau_a}. \tag{E45}$$

Here:
m is the index of the measurement epoch when the smoothed sub-corrections were generated. The smoothed sub-corrections were generated at the latest measurement epoch when a verified consistent fixed solution was available.
q is the number of measurement epochs, elapsed since the m-th measurement epoch; during these q measurement epochs, a new verified consistent fixed solution was not computed and smoothed sub-corrections were not updated.
$t_m$ is the time instant when the smoothed sub-corrections were generated.
$t_{m+q}$ is the time instant when the smoothed sub-corrections are applied.
$\tau_a$ is a specified aging time constant.
$\overline{\nabla\Delta\delta}_m^{j}$ are the smoothed sub-corrections, generated at the time instant $t_m$.
$\overline{\nabla\Delta\delta}_{m+q}^{j}$ are the smoothed sub-corrections, aged to the time instant of application $t_{m+q}$.

The process then passes to step 776. If no smoothing was performed, the aged sub-corrections are applied to the carrier phase second differences according to the following equation:

$$\nabla\Delta\hat{P}_{m+q}^{k,j} = \nabla\Delta P_{m+q}^{k,j} + \nabla\Delta\delta_{m+q}^{j}. \tag{E46}$$

Here:

$\nabla\Delta P_{m+q}{}^{k,j}$ are the uncorrected carrier phase second differences at the (m+q)-th epoch.

$\nabla\Delta\hat{P}_{m+q}{}^{k,j}$ are the carrier phase second differences, corrected with the aged sub-corrections, at the (m+q)-th epoch.

$\nabla\Delta\delta_{m+q}{}^{k,j}$ are the aged sub-corrections generated at the m-th epoch and aged to the (m+q)-th epoch.

If smoothing was performed, the aged smoothed sub-corrections are applied to the carrier phase second differences according to the following equation:

$$\nabla\Delta\hat{P}_{m+q}{}^{k,j} = \nabla\Delta P_{m+q}{}^{k,j} + \overline{\nabla\Delta\delta}_{m+q}{}^{k,j}. \qquad (E47)$$

Here:

$\nabla\Delta P_{m+q}{}^{k,j}$ are the uncorrected carrier phase second differences at the (m+q)-th epoch.

$\nabla\Delta\hat{P}_{m+q}{}^{k,j}$ are the carrier phase second differences, corrected with the aged smoothed sub-corrections, at the (m+q)-th epoch.

$\overline{\nabla\Delta\delta}_{m+q}{}^{k,j}$ are the aged smoothed sub-corrections generated at the m-th epoch and aged to the (m+q)-th epoch.

The process then passes to step 766 (FIG. 7D), described above.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for processing global navigation satellite system (GNSS) signals, the method comprising the steps of:
receiving a first plurality of first differences of carrier phase measurements, wherein the first plurality of first differences of carrier phase measurements is based at least in part on GNSS signals received by a rover from a first plurality of GNSS satellites at a first measurement epoch and GNSS signals received by a base from the first plurality of GNSS satellites at the first measurement epoch;
resolving a plurality of first differences of carrier phase ambiguities of the first plurality of first differences of carrier phase measurements;
computing a first fixed position of the rover, wherein the first fixed position of the rover is based at least in part on the plurality of first differences of carrier phase ambiguities of the first plurality of first differences of carrier phase measurements; and
computing a first plurality of sub-corrections, wherein the first plurality of sub-corrections is based at least in part on the first fixed position of the rover, a position of the base, a position of each specific GNSS satellite in the first plurality of GNSS satellites, the first plurality of first differences of carrier phase measurements, and the plurality of first differences of carrier phase ambiguities of the first plurality of first differences of carrier phase measurements.

2. The method of claim 1, further comprising the steps of:
receiving a second plurality of first differences of carrier phase measurements, wherein the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch;
verifying whether the plurality of first differences of carrier phase ambiguities of the first plurality of first differences of carrier phase measurements is consistent for the second measurement epoch;
upon verifying that the plurality of first differences of carrier phase ambiguities of the first plurality of first differences of carrier phase measurements is consistent for the second measurement epoch:
outputting a second fixed position of the rover, wherein the second fixed position of the rover is based at least in part on the second plurality of first differences of carrier phase measurements and the plurality of first differences of carrier phase ambiguities of the first plurality of first differences of carrier phase measurements; and
computing a second plurality of sub-corrections, wherein the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements; and
upon verifying that the plurality of first differences of carrier phase ambiguities of the first plurality of first differences of carrier phase measurements is not consistent for the second measurement epoch:
computing a plurality of first differences of corrected carrier phase measurements by applying the first plurality of sub-corrections to the second plurality of first differences of carrier phase measurements;
attempting to resolve a plurality of first differences of carrier phase ambiguities of the plurality of first differences of corrected carrier phase measurements; and
upon resolving a plurality of first differences of carrier phase ambiguities of the plurality of first differences of corrected carrier phase measurements:
computing and outputting a second fixed position of the rover, wherein the second fixed position of the rover is based at least in part on the plurality of first differences of carrier phase ambiguities of the plurality of first differences of corrected carrier phase measurements; and
computing a second plurality of sub-corrections, wherein the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements.

3. The method of claim 1, further comprising the steps of:
receiving a second plurality of first differences of carrier phase measurements, wherein the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch;
verifying whether the plurality of first differences of carrier phase ambiguities of the first plurality of first differences of carrier phase measurements is consistent for the second measurement epoch;
upon verifying that the plurality of first differences of carrier phase ambiguities of the first plurality of first differences of carrier phase measurements is consistent for the second measurement epoch:
  outputting a second fixed position of the rover, wherein the second fixed position of the rover is based at least in part on the second plurality of first differences of carrier phase measurements and the plurality of first differences of carrier phase ambiguities of the first plurality of first differences of carrier phase measurements; and
  computing a second plurality of sub-corrections, wherein the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements; and
upon verifying that the plurality of first differences of carrier phase ambiguities of the first plurality of first differences of carrier phase measurements is not consistent for the second measurement epoch:
  generating an aged plurality of sub-corrections by aging the first plurality of sub-corrections from the first measurement epoch to the second measurement epoch;
  computing a plurality of first differences of corrected carrier phase measurements by applying the aged first plurality of sub-corrections to the second plurality of first differences of carrier phase measurements;
  attempting to resolve a plurality of first differences of carrier phase ambiguities of the plurality of first differences of corrected carrier phase measurements; and
  upon resolving a plurality of first differences of carrier phase ambiguities of the plurality of first differences of corrected carrier phase measurements:
    computing and outputting a second fixed position of the rover, wherein the second fixed position of the rover is based at least in part on the plurality of first differences of carrier phase ambiguities of the plurality of first differences of corrected carrier phase measurements; and
    computing a second plurality of sub-corrections, wherein the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements.

4. The method of claim 1, further comprising the steps of:
receiving a second plurality of first differences of carrier phase measurements, wherein the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch;
verifying whether the plurality of first differences of carrier phase ambiguities of the first plurality of first differences of carrier phase measurements is consistent for the second measurement epoch;
upon verifying that the plurality of first differences of carrier phase ambiguities of the first plurality of first differences of carrier phase measurements is consistent for the second measurement epoch:
  outputting a second fixed position of the rover, wherein the second fixed position of the rover is based at least in part on the second plurality of first differences of carrier phase measurements and the plurality of first differences of carrier phase ambiguities of the first plurality of first differences of carrier phase measurements;
  computing a second plurality of sub-corrections, wherein the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements; and
  generating a smoothed plurality of sub-corrections, wherein the smoothed plurality of sub-corrections is based at least in part on the second plurality of sub-corrections and the first plurality of sub-corrections; and
upon verifying that the plurality of first differences of carrier phase ambiguities of the first plurality of first differences of carrier phase measurements is not consistent for the second measurement epoch:
  computing a plurality of first differences of corrected carrier phase measurements by applying the first plurality of sub-corrections to the second plurality of first differences of carrier phase measurements;
  attempting to resolve a plurality of first differences of carrier phase ambiguities of the plurality of first differences of corrected carrier phase measurements; and
  upon resolving a plurality of first differences of carrier phase ambiguities of the plurality of first differences of corrected carrier phase measurements:
    computing and outputting a second fixed position of the rover, wherein the second fixed position of the rover is based at least in part on the plurality of first differences of carrier phase ambiguities of the plurality of first differences of corrected carrier phase measurements;
    computing a second plurality of sub-corrections, wherein the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements; and
generating a smoothed plurality of sub-corrections, wherein the smoothed plurality of sub-corrections is based at least in part on the second plurality of sub-corrections and the first plurality of sub-corrections.

5. The method of claim 4, further comprising the steps of:
receiving a third plurality of first differences of carrier phase measurements, wherein the third plurality of first differences of carrier phase measurements is based at least in part on GNSS signals received by the rover from a third plurality of GNSS satellites at a third measurement epoch and GNSS signals received by the base from the third plurality of GNSS satellites at the third measurement epoch; and
generating an aged plurality of smoothed sub-corrections by aging the plurality of smoothed sub-corrections from the second measurement epoch to the third measurement epoch.

6. An apparatus for processing global navigation satellite system (GNSS) signals, the apparatus comprising:
a processor;
memory operably coupled to the processor; and
a data storage device operably coupled to the processor, wherein the data storage device stores computer program instructions, which, when executed by the processor, cause the processor to perform a method comprising the steps of:
receiving a first plurality of first differences of carrier phase measurements, wherein the first plurality of first differences of carrier phase measurements is based at least in part on GNSS signals received by a rover from a first plurality of GNSS satellites at a first measurement epoch and GNSS signals received by a base from the first plurality of GNSS satellites at the first measurement epoch;
resolving a plurality of first differences of carrier phase ambiguities of the first plurality of first differences of carrier phase measurements;
computing a first fixed position of the rover, wherein the first fixed position of the rover is based at least in part on the plurality of first differences of carrier phase ambiguities of the first plurality of first differences of carrier phase measurements; and
computing a first plurality of sub-corrections, wherein the first plurality of sub-corrections is based at least in part on the first fixed position of the rover, a position of the base, a position of each specific GNSS satellite in the first plurality of GNSS satellites, the first plurality of first differences of carrier phase measurements, and the plurality of first differences of carrier phase ambiguities of the first plurality of first differences of carrier phase measurements.

7. The apparatus of claim 6, wherein the method further comprises the steps of:
receiving a second plurality of first differences of carrier phase measurements, wherein the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch;
verifying whether the plurality of first differences of carrier phase ambiguities of the first plurality of first differences of carrier phase measurements is consistent for the second measurement epoch;
upon verifying that the plurality of first differences of carrier phase ambiguities of the first plurality of first differences of carrier phase measurements is consistent for the second measurement epoch:
outputting a second fixed position of the rover, wherein the second fixed position of the rover is based at least in part on the second plurality of first differences of carrier phase measurements and the plurality of first differences of carrier phase ambiguities of the first plurality of first differences of carrier phase measurements; and
computing a second plurality of sub-corrections, wherein the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements; and
upon verifying that the plurality of first differences of carrier phase ambiguities of the first plurality of first differences of carrier phase measurements is not consistent for the second measurement epoch:
computing a plurality of first differences of corrected carrier phase measurements by applying the first plurality of sub-corrections to the second plurality of first differences of carrier phase measurements;
attempting to resolve a plurality of first differences of carrier phase ambiguities of the plurality of first differences of corrected carrier phase measurements; and
upon resolving a plurality of first differences of carrier phase ambiguities of the plurality of first differences of corrected carrier phase measurements:
computing and outputting a second fixed position of the rover, wherein the second fixed position of the rover is based at least in part on the plurality of first differences of carrier phase ambiguities of the plurality of first differences of corrected carrier phase measurements; and
computing a second plurality of sub-corrections, wherein the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements.

8. The apparatus of claim 6, wherein the method further comprises the steps of:
receiving a second plurality of first differences of carrier phase measurements, wherein the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch;
verifying whether the plurality of first differences of carrier phase ambiguities of the first plurality of first differences of carrier phase measurements is consistent for the second measurement epoch;

upon verifying that the plurality of first differences of carrier phase ambiguities of the first plurality of first differences of carrier phase measurements is consistent for the second measurement epoch:

outputting a second fixed position of the rover, wherein the second fixed position of the rover is based at least in part on the second plurality of first differences of carrier phase measurements and the plurality of first differences of carrier phase ambiguities of the first plurality of first differences of carrier phase measurements; and computing a second plurality of sub-corrections, wherein the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements; and upon verifying that the plurality of first differences of carrier phase ambiguities of the first plurality of first differences of carrier phase measurements is not consistent for the second measurement epoch:

generating an aged plurality of sub-corrections by aging the first plurality of sub-corrections from the first measurement epoch to the second measurement epoch;

computing a plurality of first differences of corrected carrier phase measurements by applying the aged first plurality of sub-corrections to the second plurality of first differences of carrier phase measurements;

attempting to resolve a plurality of first differences of carrier phase ambiguities of the plurality of first differences of corrected carrier phase measurements; and upon resolving a plurality of first differences of carrier phase ambiguities of the plurality of first differences of corrected carrier phase measurements:

computing and outputting a second fixed position of the rover, wherein the second fixed position of the rover is based at least in part on the plurality of first differences of carrier phase ambiguities of the plurality of first differences of corrected carrier phase measurements; and computing a second plurality of sub-corrections, wherein the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements.

9. The apparatus of claim 6, wherein the method further comprises the steps of:

receiving a second plurality of first differences of carrier phase measurements, wherein the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of first differences of carrier phase ambiguities of the first plurality of first differences of carrier phase measurements is consistent for the second measurement epoch;

upon verifying that the plurality of first differences of carrier phase ambiguities of the first plurality of first differences of carrier phase measurements is consistent for the second measurement epoch:

outputting a second fixed position of the rover, wherein the second fixed position of the rover is based at least in part on the second plurality of first differences of carrier phase measurements and the plurality of first differences of carrier phase ambiguities of the first plurality of first differences of carrier phase measurements;

computing a second plurality of sub-corrections, wherein the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements; and generating a smoothed plurality of sub-corrections, wherein the smoothed plurality of sub-corrections is based at least in part on the second plurality of sub-corrections and the first plurality of sub-corrections; and upon verifying that the plurality of first differences of carrier phase ambiguities of the first plurality of first differences of carrier phase measurements is not consistent for the second measurement epoch:

computing a plurality of first differences of corrected carrier phase measurements by applying the first plurality of sub-corrections to the second plurality of first differences of carrier phase measurements;

attempting to resolve a plurality of first differences of carrier phase ambiguities of the plurality of first differences of corrected carrier phase measurements; and upon resolving a plurality of first differences of carrier phase ambiguities of the plurality of first differences of corrected carrier phase measurements:

computing and outputting a second fixed position of the rover, wherein the second fixed position of the rover is based at least in part on the plurality of first differences of carrier phase ambiguities of the plurality of first differences of corrected carrier phase measurements;

computing a second plurality of sub-corrections, wherein the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements; and generating a smoothed plurality of sub-corrections, wherein the smoothed plurality of sub-corrections is based at least in part on the second plurality of sub-corrections and the first plurality of sub-corrections.

10. The apparatus of claim 9, wherein the method further comprises the steps of:
receiving a third plurality of first differences of carrier phase measurements, wherein the third plurality of first differences of carrier phase measurements is based at least in part on GNSS signals received by the rover from a third plurality of GNSS satellites at a third measurement epoch and GNSS signals received by the base from the third plurality of GNSS satellites at the third measurement epoch; and
generating an aged plurality of smoothed sub-corrections by aging the plurality of smoothed sub-corrections from the second measurement epoch to the third measurement epoch.

11. A computer readable medium storing computer program instructions for processing global navigation satellite system (GNSS) signals, wherein the computer program instructions, when executed by a processor, cause the processor to perform a method comprising the steps of:
receiving a first plurality of first differences of carrier phase measurements, wherein the first plurality of first differences of carrier phase measurements is based at least in part on GNSS signals received by a rover from a first plurality of GNSS satellites at a first measurement epoch and GNSS signals received by a base from the first plurality of GNSS satellites at the first measurement epoch;
resolving a plurality of first differences of carrier phase ambiguities of the first plurality of first differences of carrier phase measurements;
computing a first fixed position of the rover, wherein the first fixed position of the rover is based at least in part on the plurality of first differences of carrier phase ambiguities of the first plurality of first differences of carrier phase measurements; and
computing a first plurality of sub-corrections, wherein the first plurality of sub-corrections is based at least in part on the first fixed position of the rover, a position of the base, a position of each specific GNSS satellite in the first plurality of GNSS satellites, the first plurality of first differences of carrier phase measurements, and the plurality of first differences of carrier phase ambiguities of the first plurality of first differences of carrier phase measurements.

12. The computer readable medium of claim 11, wherein the method further comprises the steps of:
receiving a second plurality of first differences of carrier phase measurements, wherein the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch;
verifying whether the plurality of first differences of carrier phase ambiguities of the first plurality of first differences of carrier phase measurements is consistent for the second measurement epoch;
upon verifying that the plurality of first differences of carrier phase ambiguities of the first plurality of first differences of carrier phase measurements is consistent for the second measurement epoch:
outputting a second fixed position of the rover, wherein the second fixed position of the rover is based at least in part on the second plurality of first differences of carrier phase measurements and the plurality of first differences of carrier phase ambiguities of the first plurality of first differences of carrier phase measurements; and
computing a second plurality of sub-corrections, wherein the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements; and
upon verifying that the plurality of first differences of carrier phase ambiguities of the first plurality of first differences of carrier phase measurements is not consistent for the second measurement epoch:
computing a plurality of first differences of corrected carrier phase measurements by applying the first plurality of sub-corrections to the second plurality of first differences of carrier phase measurements;
attempting to resolve a plurality of first differences of carrier phase ambiguities of the plurality of first differences of corrected carrier phase measurements; and
upon resolving a plurality of first differences of carrier phase ambiguities of the plurality of first differences of corrected carrier phase measurements:
computing and outputting a second fixed position of the rover, wherein the second fixed position of the rover is based at least in part on the plurality of first differences of carrier phase ambiguities of the plurality of first differences of corrected carrier phase measurements; and
computing a second plurality of sub-corrections, wherein the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements.

13. The computer readable medium of claim 11, wherein the method further comprises the steps of:
receiving a second plurality of first differences of carrier phase measurements, wherein the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch;
verifying whether the plurality of first differences of carrier phase ambiguities of the first plurality of first differences of carrier phase measurements is consistent for the second measurement epoch;
upon verifying that the plurality of first differences of carrier phase ambiguities of the first plurality of first differences of carrier phase measurements is consistent for the second measurement epoch:
outputting a second fixed position of the rover, wherein the second fixed position of the rover is based at least in part on the second plurality of first differences of carrier phase measurements and the plurality of first differences of carrier phase ambiguities of the first plurality of first differences of carrier phase measurements; and computing a second plurality of sub-corrections, wherein the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements; and upon verifying that the plurality of first differences of carrier phase ambiguities of the first plurality of first differences of carrier phase measurements is not consistent for the second measurement epoch:

generating an aged plurality of sub-corrections by aging the first plurality of sub-corrections from the first measurement epoch to the second measurement epoch;

computing a plurality of first differences of corrected carrier phase measurements by applying the aged first plurality of sub-corrections to the second plurality of first differences of carrier phase measurements;

attempting to resolve a plurality of first differences of carrier phase ambiguities of the plurality of first differences of corrected carrier phase measurements; and upon resolving a plurality of first differences of carrier phase ambiguities of the plurality of first differences of corrected carrier phase measurements:

computing and outputting a second fixed position of the rover, wherein the second fixed position of the rover is based at least in part on the plurality of first differences of carrier phase ambiguities of the plurality of first differences of corrected carrier phase measurements; and computing a second plurality of sub-corrections, wherein the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements.

14. The computer readable medium of claim 11, wherein the method further comprises the steps of:

receiving a second plurality of first differences of carrier phase measurements, wherein the second plurality of first differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of first differences of carrier phase ambiguities of the first plurality of first differences of carrier phase measurements is consistent for the second measurement epoch;

upon verifying that the plurality of first differences of carrier phase ambiguities of the first plurality of first differences of carrier phase measurements is consistent for the second measurement epoch:

outputting a second fixed position of the rover, wherein the second fixed position of the rover is based at least in part on the second plurality of first differences of carrier phase measurements and the plurality of first differences of carrier phase ambiguities of the first plurality of first differences of carrier phase measurements;

computing a second plurality of sub-corrections, wherein the second plurality of sub-corrections is based at least in part on the second fixed position of the rover, the position of the base, a position of each specific GNSS satellite in the second plurality of GNSS satellites, the second plurality of first differences of carrier phase measurements, and the plurality of first differences of carrier phase ambiguities of the first plurality of first differences of carrier phase measurements; and generating a smoothed plurality of sub-corrections, wherein the smoothed plurality of sub-corrections is based at least in part on the second plurality of sub-corrections and the first plurality of sub-corrections; and upon verifying that the plurality of first differences of carrier phase ambiguities of the first plurality of first differences of carrier phase measurements is not consistent for the second measurement epoch:

computing a plurality of first differences of corrected carrier phase measurements by applying the first plurality of sub-corrections to the second plurality of first differences of carrier phase measurements;

attempting to resolve a plurality of first differences of carrier phase ambiguities of the plurality of first differences of corrected carrier phase measurements; and upon resolving a plurality of first differences of carrier phase ambiguities of the plurality of first differences of corrected carrier phase measurements:

computing and outputting a second fixed position of the rover, wherein the second fixed position of the rover is based at least in part on the plurality of first differences of carrier phase ambiguities of the plurality of first differences of corrected carrier phase measurements;

computing a second plurality of sub-corrections, wherein the second plurality of sub-corrections is based at least in part on the second fixed position of the rover, a position of the base, a position of each specific GNSS satellite in the second plurality of GNSS satellites, the second plurality of first differences of carrier phase measurements, and the plurality of first differences of carrier phase ambiguities of the plurality of first differences of corrected carrier phase measurements; and generating a smoothed plurality of sub-corrections, wherein the smoothed plurality of sub-corrections is based at least in part on the second plurality of sub-corrections and the first plurality of sub-corrections.

15. The computer readable medium of claim 14, wherein the method further comprises the steps of:

receiving a third plurality of first differences of carrier phase measurements, wherein the third plurality of first differences of carrier phase measurements is based at least in part on GNSS signals received by the rover from a third plurality of GNSS satellites at a third measurement epoch and GNSS signals received by the base from the third plurality of GNSS satellites at the third measurement epoch; and generating an aged plurality of smoothed sub-corrections by aging the plurality of smoothed sub-corrections from the second measurement epoch to the third measurement epoch.

16. A method for processing global navigation satellite system (GNSS) signals, the method comprising the steps of:

receiving a first plurality of second differences of carrier phase measurements, wherein the first plurality of second differences of carrier phase measurements is based at least in part on GNSS signals received by a rover from a first plurality of GNSS satellites at a first measurement epoch and GNSS signals received by a base from the first plurality of GNSS satellites at the first measurement epoch;

resolving a plurality of second differences of carrier phase ambiguities of the first plurality of second differences of carrier phase measurements;

computing a first fixed position of the rover, wherein the first fixed position of the rover is based at least in part on the plurality of second differences of carrier phase ambiguities of the first plurality of second differences of carrier phase measurements; and computing a first plurality of sub-corrections, wherein the first plurality of sub-corrections is based at least in part on the first fixed position of the rover, a position of the base, a position of each specific GNSS satellite in the first plurality of GNSS satellites, and the first plurality of second differences of carrier phase measurements.

17. The method of claim 16, further comprising the steps of:

receiving a second plurality of second differences of carrier phase measurements, wherein the second plurality of second differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of second differences of carrier phase ambiguities of the first plurality of second differences of carrier phase measurements is consistent for the second measurement epoch;

upon verifying that the plurality of second differences of carrier phase ambiguities of the first plurality of second differences of carrier phase measurements is consistent for the second measurement epoch:

outputting a second fixed position of the rover, wherein the second fixed position of the rover is based at least in part on the second plurality of second differences of carrier phase measurements and the plurality of second differences of carrier phase ambiguities of the first plurality of second differences of carrier phase measurements; and computing a second plurality of sub-corrections, wherein the second plurality of sub-corrections is based at least in part on the second fixed position of the rover, the position of the base, a position of each specific GNSS satellite in the second plurality of GNSS satellites, and the second plurality of second differences of carrier phase measurements; and upon verifying that the plurality of second differences of carrier phase ambiguities of the first plurality of second differences of carrier phase measurements is not consistent for the second measurement epoch:

computing a plurality of second differences of corrected carrier phase measurements by applying the first plurality of sub-corrections to the second plurality of second differences of carrier phase measurements;

attempting to resolve a plurality of second differences of carrier phase ambiguities of the plurality of second differences of corrected carrier phase measurements; and upon resolving a plurality of second differences of carrier phase ambiguities of the plurality of second differences of corrected carrier phase measurements:

computing and outputting a second fixed position of the rover, wherein the second fixed position of the rover is based at least in part on the plurality of second differences of carrier phase ambiguities of the plurality of second differences of corrected carrier phase measurements; and computing a second plurality of sub-corrections, wherein the second plurality of sub-corrections is based at least in part on the second fixed position of the rover, a position of the base, a position of each specific GNSS satellite in the second plurality of GNSS satellites, and the second plurality of second differences of carrier phase measurements.

18. The method of claim 16, further comprising the steps of:

receiving a second plurality of second differences of carrier phase measurements, wherein the second plurality of second differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of second differences of carrier phase ambiguities of the first plurality of second differences of carrier phase measurements is consistent for the second measurement epoch;

upon verifying that the plurality of second differences of carrier phase ambiguities of the first plurality of second differences of carrier phase measurements is consistent for the second measurement epoch:

outputting a second fixed position of the rover, wherein the second fixed position of the rover is based at least in part on the second plurality of second differences of carrier phase measurements and the plurality of second differences of carrier phase ambiguities of the first plurality of second differences of carrier phase measurements; and computing a second plurality of sub-corrections, wherein the second plurality of sub-corrections is based at least in part on the second fixed position of the rover, the position of the base, a position of each specific GNSS satellite in the second plurality of GNSS satellites, and the second plurality of second differences of carrier phase measurements; and upon verifying that the plurality of second differences of carrier phase ambiguities of the first plurality of second differences of carrier phase measurements is not consistent for the second measurement epoch:

generating an aged plurality of sub-corrections by aging the first plurality of sub-corrections from the first measurement epoch to the second measurement epoch;

computing a plurality of second differences of corrected carrier phase measurements by applying the aged first plurality of sub-corrections to the second plurality of second differences of carrier phase measurements;

attempting to resolve a plurality of second differences of carrier phase ambiguities of the plurality of second differences of corrected carrier phase measurements; and upon resolving a plurality of second differences of carrier phase ambiguities of the plurality of second differences of corrected carrier phase measurements:

computing and outputting a second fixed position of the rover, wherein the second fixed position of the rover is based at least in part on the plurality of second differences of carrier phase ambiguities of the plurality of second differences of corrected carrier phase measurements; and computing a second plurality of sub-corrections, wherein the second plurality of sub-corrections is based at least in part on the second fixed position of the rover, a position of the base, a position of each specific GNSS satellite in the second plurality of GNSS satellites, and the second plurality of second differences of carrier phase measurements.

19. The method of claim 16, further comprising the steps of:

receiving a second plurality of second differences of carrier phase measurements, wherein the second plurality of second differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of second differences of carrier phase ambiguities of the first plurality of second differences of carrier phase measurements is consistent for the second measurement epoch;

upon verifying that the plurality of second differences of carrier phase ambiguities of the first plurality of second differences of carrier phase measurements is consistent for the second measurement epoch:

outputting a second fixed position of the rover, wherein the second fixed position of the rover is based at least in part on the second plurality of second differences of carrier phase measurements and the plurality of second differences of carrier phase ambiguities of the first plurality of second differences of carrier phase measurements;

computing a second plurality of sub-corrections, wherein the second plurality of sub-corrections is based at least in part on the second fixed position of the rover, the position of the base, a position of each specific GNSS satellite in the second plurality of GNSS satellites, and the second plurality of second differences of carrier phase measurements; and generating a smoothed plurality of sub-corrections, wherein the smoothed plurality of sub-corrections is based at least in part on the second plurality of sub-corrections and the first plurality of sub-corrections; and upon verifying that the plurality of second differences of carrier phase ambiguities of the first plurality of second differences of carrier phase measurements is not consistent for the second measurement epoch:

computing a plurality of second differences of corrected carrier phase measurements by applying the first plurality of sub-corrections to the second plurality of second differences of carrier phase measurements;

attempting to resolve a plurality of second differences of carrier phase ambiguities of the plurality of second differences of corrected carrier phase measurements; and upon resolving a plurality of second differences of carrier phase ambiguities of the plurality of second differences of corrected carrier phase measurements:

computing and outputting a second fixed position of the rover, wherein the second fixed position of the rover is based at least in part on the plurality of second differences of carrier phase ambiguities of the plurality of second differences of corrected carrier phase measurements;

computing a second plurality of sub-corrections, wherein the second plurality of sub-corrections is based at least in part on the second fixed position of the rover, a position of the base, a position of each specific GNSS satellite in the second plurality of GNSS satellites, and the second plurality of second differences of carrier phase measurements; and generating a smoothed plurality of sub-corrections, wherein the smoothed plurality of sub-corrections is based at least in part on the second plurality of sub-corrections and the first plurality of sub-corrections.

20. The method of claim 19, further comprising the steps of:

receiving a third plurality of second differences of carrier phase measurements, wherein the third plurality of second differences of carrier phase measurements is based at least in part on GNSS signals received by the rover from a third plurality of GNSS satellites at a third measurement epoch and GNSS signals received by the base from the third plurality of GNSS satellites at the third measurement epoch; and generating an aged plurality of smoothed sub-corrections by aging the plurality of smoothed sub-corrections from the second measurement epoch to the third measurement epoch.

21. An apparatus for processing global navigation satellite system (GNSS) signals, the apparatus comprising:

a processor;

memory operably coupled to the processor; and a data storage device operably coupled to the processor, wherein the data storage device stores computer program instructions, which, when executed by the processor, cause the processor to perform a method comprising the steps of:

receiving a first plurality of second differences of carrier phase measurements, wherein the first plurality of second differences of carrier phase measurements is based at least in part on GNSS signals received by a rover from a first plurality of GNSS satellites at a first measurement epoch and GNSS signals received by a base from the first plurality of GNSS satellites at the first measurement epoch;

resolving a plurality of second differences of carrier phase ambiguities of the first plurality of second differences of carrier phase measurements;

computing a first fixed position of the rover, wherein the first fixed position of the rover is based at least in part on the plurality of second differences of carrier phase ambiguities of the first plurality of second differences of carrier phase measurements; and computing a first plurality of sub-corrections, wherein the first plurality of sub-corrections is based at least in part on the first fixed position of the rover, a position of the base, a position of each specific GNSS satellite in the first plurality of GNSS satellites, and the first plurality of second differences of carrier phase measurements.

22. The apparatus of claim 21, wherein the method further comprises the steps of:

receiving a second plurality of second differences of carrier phase measurements, wherein the second plurality of second differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of second differences of carrier phase ambiguities of the first plurality of second differences of carrier phase measurements is consistent for the second measurement epoch;

upon verifying that the plurality of second differences of carrier phase ambiguities of the first plurality of second differences of carrier phase measurements is consistent for the second measurement epoch:

outputting a second fixed position of the rover, wherein the second fixed position of the rover is based at least in part on the second plurality of second differences of carrier phase measurements and the plurality of second differences of carrier phase ambiguities of the first plurality of second differences of carrier phase measurements; and computing a second plurality of sub-corrections, wherein the second plurality of sub-corrections is based at least in part on the second fixed position of the rover, the position of the base, a position of each specific GNSS satellite in the second plurality of GNSS satellites, and the second plurality of second differences of carrier phase measurements; and upon verifying that the plurality of second differences of carrier phase ambiguities of the first plurality of second differences of carrier phase measurements is not consistent for the second measurement epoch:

computing a plurality of second differences of corrected carrier phase measurements by applying the first plurality of sub-corrections to the second plurality of second differences of carrier phase measurements;

attempting to resolve a plurality of second differences of carrier phase ambiguities of the plurality of second differences of corrected carrier phase measurements; and upon resolving a plurality of second differences of carrier phase ambiguities of the plurality of second differences of corrected carrier phase measurements:

computing and outputting a second fixed position of the rover, wherein the second fixed position of the rover is based at least in part on the plurality of second differences of carrier phase ambiguities of the plurality of second differences of corrected carrier phase measurements; and computing a second plurality of sub-corrections, wherein the second plurality of sub-corrections is based at least in part on the second fixed position of the rover, a position of the base, a position of each specific GNSS satellite in the second plurality of GNSS satellites, and the second plurality of second differences of carrier phase measurements.

23. The apparatus of claim 21, wherein the method further comprises the steps of:

receiving a second plurality of second differences of carrier phase measurements, wherein the second plurality of second differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of second differences of carrier phase ambiguities of the first plurality of second differences of carrier phase measurements is consistent for the second measurement epoch;

upon verifying that the plurality of second differences of carrier phase ambiguities of the first plurality of second differences of carrier phase measurements is consistent for the second measurement epoch:

outputting a second fixed position of the rover, wherein the second fixed position of the rover is based at least in part on the second plurality of second differences of carrier phase measurements and the plurality of second differences of carrier phase ambiguities of the first plurality of second differences of carrier phase measurements; and computing a second plurality of sub-corrections, wherein the second plurality of sub-corrections is based at least in part on the second fixed position of the rover, the position of the base, a position of each specific GNSS satellite in the second plurality of GNSS satellites, and the second plurality of second differences of carrier phase measurements; and upon verifying that the plurality of second differences of carrier phase ambiguities of the first plurality of second differences of carrier phase measurements is not consistent for the second measurement epoch:

generating an aged plurality of sub-corrections by aging the first plurality of sub-corrections from the first measurement epoch to the second measurement epoch;

computing a plurality of second differences of corrected carrier phase measurements by applying the aged first plurality of sub-corrections to the second plurality of second differences of carrier phase measurements;

attempting to resolve a plurality of second differences of carrier phase ambiguities of the plurality of second differences of corrected carrier phase measurements; and upon resolving a plurality of second differences of carrier phase ambiguities of the plurality of second differences of corrected carrier phase measurements:

computing and outputting a second fixed position of the rover, wherein the second fixed position of the rover is based at least in part on the plurality of second differences of carrier phase ambiguities of the plurality of second differences of corrected carrier phase measurements; and computing a second plurality of sub-corrections, wherein the second plurality of sub-corrections is based at least in part on the second fixed position of the rover, a position of the base, a position of each specific GNSS satellite in the second plurality of GNSS satellites, and the second plurality of second differences of carrier phase measurements.

24. The apparatus of claim 21, wherein the method further comprises the steps of:

receiving a second plurality of second differences of carrier phase measurements, wherein the second plurality of second differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of second differences of carrier phase ambiguities of the first plurality of second differences of carrier phase measurements is consistent for the second measurement epoch;

upon verifying that the plurality of second differences of carrier phase ambiguities of the first plurality of second differences of carrier phase measurements is consistent for the second measurement epoch:

outputting a second fixed position of the rover, wherein the second fixed position of the rover is based at least in part on the second plurality of second differences of carrier phase measurements and the plurality of second differences of carrier phase ambiguities of the first plurality of second differences of carrier phase measurements;

computing a second plurality of sub-corrections, wherein the second plurality of sub-corrections is based at least in part on the second fixed position of the rover, the position of the base, a position of each specific GNSS satellite in the second plurality of GNSS satellites, and the second plurality of second differences of carrier phase measurements; and generating a smoothed plurality of sub-corrections, wherein the smoothed plurality of sub-corrections is based at least in part on the second plurality of sub-corrections and the first plurality of sub-corrections; and upon verifying that the plurality of second differences of carrier phase ambiguities of the first plurality of second differences of carrier phase measurements is not consistent for the second measurement epoch:

computing a plurality of second differences of corrected carrier phase measurements by applying the first plurality of sub-corrections to the second plurality of second differences of carrier phase measurements;

attempting to resolve a plurality of second differences of carrier phase ambiguities of the plurality of second differences of corrected carrier phase measurements; and upon resolving a plurality of second differences of carrier phase ambiguities of the plurality of second differences of corrected carrier phase measurements:

computing and outputting a second fixed position of the rover, wherein the second fixed position of the rover is based at least in part on the plurality of second differences of carrier phase ambiguities of the plurality of second differences of corrected carrier phase measurements;

computing a second plurality of sub-corrections, wherein the second plurality of sub-corrections is based at least in part on the second fixed position of the rover, a position of the base, a position of each specific GNSS satellite in the second plurality of GNSS satellites, and the second plurality of second differences of carrier phase measurements; and generating a smoothed plurality of sub-corrections, wherein the smoothed plurality of sub-corrections is based at least in part on the second plurality of sub-corrections and the first plurality of sub-corrections.

25. The apparatus of claim 24, wherein the method further comprises the steps of:

receiving a third plurality of second differences of carrier phase measurements, wherein the third plurality of second differences of carrier phase measurements is based at least in part on GNSS signals received by the rover from a third plurality of GNSS satellites at a third measurement epoch and GNSS signals received by the base from the third plurality of GNSS satellites at the third measurement epoch; and generating an aged plurality of smoothed sub-corrections by aging the plurality of smoothed sub-corrections from the second measurement epoch to the third measurement epoch.

26. A computer readable medium storing computer program instructions for processing global navigation satellite system (GNSS) signals, wherein the computer program instructions, when executed by a processor, cause the processor to perform a method comprising the steps of:

receiving a first plurality of second differences of carrier phase measurements, wherein the first plurality of second differences of carrier phase measurements is based at least in part on GNSS signals received by a rover from a first plurality of GNSS satellites at a first measurement epoch and GNSS signals received by a base from the first plurality of GNSS satellites at the first measurement epoch;

resolving a plurality of second differences of carrier phase ambiguities of the first plurality of second differences of carrier phase measurements;

computing a first fixed position of the rover, wherein the first fixed position of the rover is based at least in part on the plurality of second differences of carrier phase ambiguities of the first plurality of second differences of carrier phase measurements; and computing a first plurality of sub-corrections, wherein the first plurality of sub-corrections is based at least in part on the first fixed position of the rover, a position of the base, a position of each specific GNSS satellite in the first plurality of GNSS satellites, and the first plurality of second differences of carrier phase measurements.

27. The computer readable medium of claim 26, wherein the method further comprises the steps of:

receiving a second plurality of second differences of carrier phase measurements, wherein the second plurality of second differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of second differences of carrier phase ambiguities of the first plurality of second differences of carrier phase measurements is consistent for the second measurement epoch;

upon verifying that the plurality of second differences of carrier phase ambiguities of the first plurality of second differences of carrier phase measurements is consistent for the second measurement epoch:

outputting a second fixed position of the rover, wherein the second fixed position of the rover is based at least in part on the second plurality of second differences of carrier phase measurements and the plurality of second differences of carrier phase ambiguities of the first plurality of second differences of carrier phase measurements; and computing a second plurality of sub-corrections, wherein the second plurality of sub-corrections is based at least in part on the second fixed position of the rover, the position of the base, a position of each specific GNSS satellite in the second plurality of GNSS satellites, and the second plurality of second differences of carrier phase measurements; and upon verifying that the plurality of second differences of carrier phase ambiguities of the first plurality of second differences of carrier phase measurements is not consistent for the second measurement epoch:

computing a plurality of second differences of corrected carrier phase measurements by applying the first plurality of sub-corrections to the second plurality of second differences of carrier phase measurements;

attempting to resolve a plurality of second differences of carrier phase ambiguities of the plurality of second differences of corrected carrier phase measurements; and upon resolving a plurality of second differences of carrier phase ambiguities of the plurality of second differences of corrected carrier phase measurements:

computing and outputting a second fixed position of the rover, wherein the second fixed position of the rover is based at least in part on the plurality of second differences of carrier phase ambiguities of the plurality of second differences of corrected carrier phase measurements; and computing a second plurality of sub-corrections, wherein the second plurality of sub-corrections is based at least in part on the second fixed position of the rover, a position of the base, a position of each specific GNSS satellite in the second plurality of GNSS satellites, and the second plurality of second differences of carrier phase measurements.

28. The computer readable medium of claim 26, wherein the method further comprises the steps of:

receiving a second plurality of second differences of carrier phase measurements, wherein the second plurality of second differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of second differences of carrier phase ambiguities of the first plurality of second differences of carrier phase measurements is consistent for the second measurement epoch;

upon verifying that the plurality of second differences of carrier phase ambiguities of the first plurality of second differences of carrier phase measurements is consistent for the second measurement epoch:

outputting a second fixed position of the rover, wherein the second fixed position of the rover is based at least in part on the second plurality of second differences of carrier phase measurements and the plurality of second differences of carrier phase ambiguities of the first plurality of second differences of carrier phase measurements; and computing a second plurality of sub-corrections, wherein the second plurality of sub-corrections is based at least in part on the second fixed position of the rover, the position of the base, a position of each specific GNSS satellite in the second plurality of GNSS satellites, and the second plurality of second differences of carrier phase measurements; and upon verifying that the plurality of second differences of carrier phase ambiguities of the first plurality of second differences of carrier phase measurements is not consistent for the second measurement epoch:

generating an aged plurality of sub-corrections by aging the first plurality of sub-corrections from the first measurement epoch to the second measurement epoch;

computing a plurality of second differences of corrected carrier phase measurements by applying the aged first plurality of sub-corrections to the second plurality of second differences of carrier phase measurements;

attempting to resolve a plurality of second differences of carrier phase ambiguities of the plurality of second differences of corrected carrier phase measurements; and upon resolving a plurality of second differences of carrier phase ambiguities of the plurality of second differences of corrected carrier phase measurements:

computing and outputting a second fixed position of the rover, wherein the second fixed position of the rover is based at least in part on the plurality of second differences of carrier phase ambiguities of the plurality of second differences of corrected carrier phase measurements; and computing a second plurality of sub-corrections, wherein the second plurality of sub-corrections is based at least in part on the second fixed position of the rover, a position of the base, a position of each specific GNSS satellite in the second plurality of GNSS satellites, and the second plurality of second differences of carrier phase measurements.

29. The computer readable medium of claim 26, wherein the method further comprises the steps of:

receiving a second plurality of second differences of carrier phase measurements, wherein the second plurality of second differences of carrier phase measurements is based at least in part on GNSS signals received by the rover from a second plurality of GNSS satellites at a second measurement epoch and GNSS signals received by the base from the second plurality of GNSS satellites at the second measurement epoch;

verifying whether the plurality of second differences of carrier phase ambiguities of the first plurality of second differences of carrier phase measurements is consistent for the second measurement epoch;

upon verifying that the plurality of second differences of carrier phase ambiguities of the first plurality of second differences of carrier phase measurements is consistent for the second measurement epoch:

outputting a second fixed position of the rover, wherein the second fixed position of the rover is based at least in part on the second plurality of second differences of carrier phase measurements and the plurality of second differences of carrier phase ambiguities of the first plurality of second differences of carrier phase measurements;

computing a second plurality of sub-corrections, wherein the second plurality of sub-corrections is based at least in part on the second fixed position of the rover, the position of the base, a position of each specific GNSS satellite in the second plurality of GNSS satellites, and the second plurality of second differences of carrier phase measurements; and generating a smoothed plurality of sub-corrections, wherein the smoothed plurality of sub-corrections is based at least in part on the second plurality of sub-corrections and the first plurality of sub-corrections; and upon verifying that the plurality of second differences of carrier phase ambiguities of the first plurality of second differences of carrier phase measurements is not consistent for the second measurement epoch:

computing a plurality of second differences of corrected carrier phase measurements by applying the first plurality of sub-corrections to the second plurality of second differences of carrier phase measurements;

attempting to resolve a plurality of second differences of carrier phase ambiguities of the plurality of second differences of corrected carrier phase measurements; and upon resolving a plurality of second differences of carrier phase ambiguities of the plurality of second differences of corrected carrier phase measurements:

computing and outputting a second fixed position of the rover, wherein the second fixed position of the rover is based at least in part on the plurality of second differences of carrier phase ambiguities of the plurality of second differences of corrected carrier phase measurements;

computing a second plurality of sub-corrections, wherein the second plurality of sub-corrections is based at least in part on the second fixed position of the rover, a position of the base, a position of each specific GNSS satellite in the second plurality of GNSS satellites, and the second plurality of second differences of carrier phase measurements; and generating a smoothed plurality of sub-corrections, wherein the smoothed plurality of sub-corrections is based at least in part on the second plurality of sub-corrections and the first plurality of sub-corrections.

30. The computer readable medium of claim 29, wherein the method further comprises the steps of:

receiving a third plurality of second differences of carrier phase measurements, wherein the third plurality of second differences of carrier phase measurements is based at least in part on GNSS signals received by the rover from a third plurality of GNSS satellites at a third measurement epoch and GNSS signals received by the base from the third plurality of GNSS satellites at the third measurement epoch; and generating an aged plurality of smoothed sub-corrections by aging the plurality of smoothed sub-corrections from the second measurement epoch to the third measurement epoch.

* * * * *

UNITED STATES PATENT AND TRADEMARK OFFICE
CERTIFICATE OF CORRECTION

PATENT NO. : 9,798,017 B2
APPLICATION NO. : 15/320056
DATED : October 24, 2017
INVENTOR(S) : Mark Isaakovich Zhodzishsky et al.

It is certified that error appears in the above-identified patent and that said Letters Patent is hereby corrected as shown below:

In the Specification

Column 16, Line 63, "$\widetilde{R}_B^j$" should read -- $\widetilde{R}_R^j$ --

Column 22, Line 40, "$\overline{\Delta\tilde{\delta}}_{s-1}^j$" should read -- $\overline{\Delta\delta}_{s-1}^j$ --

Column 22, Line 48, "$\overline{\Delta\tilde{\delta}}_{s-1}$" should read -- $\overline{\Delta\delta}_{s-1}^j$ --

Column 22, Line 53, "$\overline{\Delta\tilde{\delta}}_{s-1}^j$" should read -- $\overline{\Delta\delta}_{s-1}^j$ --

Column 22, Line 60, "$\overline{\Delta\tilde{\delta}}_{s-1}^j$" should read -- $\overline{\Delta\delta}_{s-1}^j$ --

Column 24, Line 20, "$\Delta P_{m+q}^j$" should read -- $\Delta P_{m+q}^j$ --

Column 24, Line 20, "$\Delta \hat{P}_{m+q}^j$" should read -- $\Delta \hat{P}_{m+q}^j$ --

Column 24, Line 23, "$\Delta P_{m+q}^j$" should read -- $\Delta P_{m+q}^j$ --

Column 24, Line 25, "$\Delta \hat{P}_{m+q}^j$" should read -- $\Delta \hat{P}_{m+q}^j$ --

Signed and Sealed this
Sixteenth Day of October, 2018

Andrei Iancu
*Director of the United States Patent and Trademark Office*

CERTIFICATE OF CORRECTION (continued)
U.S. Pat. No. 9,798,017 B2

Column 24, Line 32, "$\Delta P_{m+q}{}^j$" should read -- $\Delta P^j_{m+q}$ --

Column 24, Line 32, "$\Delta \hat{P}_{m+q}{}^j$" should read -- $\Delta \hat{P}^j_{m+q}$ --

Column 24, Line 34, "$\Delta P_{m+q}{}^j$" should read -- $\Delta P^j_{m+q}$ --

Column 24, Line 36, "$\Delta \hat{P}_{m+q}{}^j$" should read -- $\Delta \hat{P}^j_{m+q}$ --

Column 24, Line 42, "$\Delta \hat{P}_{m+q}{}^j$" should read -- $\Delta \hat{P}^j_{m+q}$ --

Column 24, Line 48, "$\Delta \hat{P}_{m+q}{}^j$" should read -- $\Delta \hat{P}^j_{m+q}$ --

Column 25, Line 5, "$\Delta \delta_{m+q}{}^j$" should read -- $\Delta \delta^j_{m+q}$ --

Column 25, Line 22, "$\Delta \delta_{m+q}{}^j$" should read -- $\Delta \delta^j_{m+q}$ --

Column 25, Line 28, "$\overline{\Delta \delta}_{m+q}{}^j$" should read -- $\overline{\Delta \delta}^j_{m+q}$ --

Column 25, Line 48, "$\overline{\Delta \delta}_{m+q}{}^j$" should read -- $\overline{\Delta \delta}^j_{m+q}$ --

Column 25, Line 55, "$\Delta \tilde{\delta}_{m+q}{}^j$" should read -- $\Delta \delta^j_{m+q}$ --

Column 25, Line 55, "$\Delta P_{m+q}{}^j$" should read -- $\Delta P^j_{m+q}$ --

Column 25, Line 55, "$\Delta \hat{P}_{m+q}{}^j$" should read -- $\Delta \hat{P}^j_{m+q}$ --

Column 25, Line 57, "$\Delta P_{m+q}{}^j$" should read -- $\Delta P^j_{m+q}$ --

Column 25, Line 59, "$\Delta P_{m+q}{}^j$" should read -- $\Delta \hat{P}^j_{m+q}$ --

Column 25, Line 61, "$\Delta \delta_{m+q}{}^j$" should read -- $\Delta \delta^j_{m+q}$ --

CERTIFICATE OF CORRECTION (continued)　　　　　　　　　　　　　　　　　　　　Page 3 of 5
U.S. Pat. No. 9,798,017 B2

Column 25, Line 67, "$\Delta P_{m+q}{}^j$" should read -- $\Delta P_{m+q}^j$ --

Column 25, Line 67, "$\overline{\Delta \delta}_{m+q}{}^j$" should read -- $\overline{\Delta \delta}_{m+q}^j$ --

Column 25, Line 67, "$\Delta \hat{P}_{m+q}{}^j$" should read -- $\Delta \hat{P}_{m+q}^j$ --

Column 26, Line 2, "$\Delta P_{m+q}{}^j$" should read -- $\Delta P_{m+q}^j$ --

Column 26, Line 4, "$\Delta \hat{P}_{m+q}{}^j$" should read -- $\Delta \hat{P}_{m+q}^j$ --

Column 26, Line 7, "$\overline{\Delta \delta}_{m+q}{}^j$" should read -- $\overline{\Delta \delta}_{m+q}^j$ --

Column 27, Line 48, "$\overline{\nabla \Delta \delta}_{s-1}{}^{k,j}$" should read -- $\overline{\nabla \Delta \delta}_{s-1}^{k,j}$ --

Column 27, Line 59, "$\overline{\nabla \Delta \delta}_{s-1}{}^{k,j}$" should read -- $\overline{\nabla \Delta \delta}_{s-1}^{k,j}$ --

Column 27, Line 64, "$\overline{\nabla \Delta \delta}_{s-1}{}^{k,j}$" should read -- $\overline{\nabla \Delta \delta}_{s-1}^{k,j}$ --

Column 28, Line 5, "$\overline{\nabla \Delta \delta}_{s-1}{}^{k,j}$" should read -- $\overline{\nabla \Delta \delta}_{s-1}^{k,j}$ --

Column 29, Line 32, "$\nabla \Delta P_{m+q}{}^{k,j}$" should read -- $\nabla \Delta P_{m+q}^{k,j}$ --

Column 29, Line 32, "$\nabla \Delta \hat{P}_{m+q}{}^{k,j}$" should read -- $\nabla \Delta \hat{P}_{m+q}^{k,j}$ --

Column 29, Line 34, "$\nabla \Delta P_{m+q}{}^{k,j}$" should read -- $\nabla \Delta P_{m+q}^{k,j}$ --

Column 29, Line 36, "$\nabla \Delta \hat{P}_{m+q}{}^{k,j}$" should read -- $\nabla \Delta \hat{P}_{m+q}^{k,j}$ --

Column 29, Line 38, "$\nabla \Delta \delta_m{}^{k,j}$" should read -- $\nabla \Delta \delta_m^{k,j}$ --

Column 29, Line 43, "$\nabla \Delta P_{m+q}{}^{k,j}$" should read -- $\nabla \Delta P_{m+q}^{k,j}$ --

Column 29, Line 43, "$\overline{\nabla\Delta\delta}_m^{k,j}$" should read -- $\overline{\nabla\Delta\delta_m^{k,j}}$ --

Column 29, Line 43, "$\nabla\Delta\hat{P}_{m+q}^{k,j}$" should read -- $\nabla\Delta\hat{P}_{m+q}^{k,j}$ --

Column 29, Line 46, "$\nabla\Delta P_{m+q}^{j}$" should read -- $\nabla\Delta P_{m+q}^{j}$ --

Column 29, Line 48, "$\nabla\Delta\hat{P}_{m+q}^{k,j}$" should read -- $\nabla\Delta\hat{P}_{m+q}^{k,j}$ --

Column 29, Line 51, "$\nabla\Delta\delta_m^{k,j}$" should read -- $\overline{\nabla\Delta\delta_m^{k,j}}$ --

Column 29, Line 54, "$\nabla\Delta\hat{P}_{m+q}^{k,j}$" should read -- $\nabla\Delta\hat{P}_{m+q}^{k,j}$ --

Column 29, Line 60, "$\nabla\Delta\hat{P}_{m+q}^{k,j}$" should read -- $\nabla\Delta\hat{P}_{m+q}^{k,j}$ --

Column 30, Line 17, "$\nabla\Delta\delta_{m+q}^{k,j}$" should read -- $\nabla\Delta\delta_{m+q}^{k,j}$ --

Column 30, Line 17, "$\nabla\Delta\delta_m^{k,j}$" should read -- $\nabla\Delta\delta_m^{k,j}$ --

Column 30, Line 33, "$\nabla\Delta\delta_m^{k,j}$" should read -- $\nabla\Delta\delta_m^{k,j}$ --

Column 30, Line 35, "$\nabla\Delta\delta_{m+q}^{k,j}$" should read -- $\nabla\Delta\delta_{m+q}^{k,j}$ --

Column 30, Line 41, "$\overline{\nabla\Delta\delta}_{m+q}^{k,j}$" should read -- $\overline{\nabla\Delta\delta_{m+q}^{k,j}}$ --

Column 30, Line 41, "$\overline{\nabla\Delta\delta}_m^{k,j}$" should read -- $\overline{\nabla\Delta\delta_m^{k,j}}$ --

Column 30, Line 60, "$\overline{\nabla\Delta\delta}_{m+q}^{j}$" should read -- $\overline{\nabla\Delta\delta_{m+q}^{j}}$ --

Column 30, Line 67, "$\nabla\Delta P_{m+q}^{k,j}$" should read -- $\nabla\Delta P_{m+q}^{k,j}$ --

Column 30, Line 67, "$\nabla\Delta\delta_{m+q}^{j}$" should read -- $\nabla\Delta\delta_{m+q}^{j}$ --

CERTIFICATE OF CORRECTION (continued)
U.S. Pat. No. 9,798,017 B2

Column 30, Line 67, "$\nabla \Delta \hat{P}_{m+q}{}^{k,j}$" should read -- $\nabla \Delta \hat{P}_{m+q}^{k,j}$ --

Column 31, Line 2, "$\nabla \Delta P_{m+q}{}^{k,j}$" should read -- $\nabla \Delta P_{m+q}^{k,j}$ --

Column 31, Line 4, "$\nabla \Delta \hat{P}_{m+q}{}^{k,j}$" should read -- $\nabla \Delta \hat{P}_{m+q}^{k,j}$ --

Column 31, Line 7, "$\nabla \Delta \delta_{m+q}{}^{k,j}$" should read -- $\nabla \Delta \delta_{m+q}^{k,j}$ --

Column 31, Line 13, "$\nabla \Delta P_{m+q}{}^{k,j}$" should read -- $\nabla \Delta P_{m+q}^{k,j}$ --

Column 31, Line 13, "$\overline{\nabla \Delta \delta}_{m+q}{}^{k,j}$" should read -- $\overline{\nabla \Delta \delta}_{m+q}^{k,j}$ --

Column 31, Line 13, "$\nabla \Delta \hat{P}_{m+q}{}^{k,j}$" should read -- $\nabla \Delta \hat{P}_{m+q}^{k,j}$ --

Column 31, Line 16, "$\nabla \Delta P_{m+q}{}^{k,j}$" should read -- $\nabla \Delta P_{m+q}^{k,j}$ --

Column 31, Line 18, "$\nabla \Delta \hat{P}_{m+q}{}^{k,j}$" should read -- $\nabla \Delta \hat{P}_{m+q}^{k,j}$ --

Column 31, Line 21, "$\overline{\nabla \Delta \delta}_{m+q}{}^{k,j}$" should read -- $\overline{\nabla \Delta \delta}_{m+q}^{k,j}$ --